US010755045B2

(12) United States Patent
Crouse et al.

(10) Patent No.: US 10,755,045 B2
(45) Date of Patent: Aug. 25, 2020

(54) AUTOMATIC HUMAN-EMULATIVE DOCUMENT ANALYSIS ENHANCEMENTS

(71) Applicant: AON RISK SERVICES, INC. OF MARYLAND, New York, NY (US)

(72) Inventors: Daniel Crouse, Seattle, WA (US); John E. Bradley, III, Duvall, WA (US); Benjamin A. Keim, Kirkland, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 0 days.

(21) Appl. No.: 15/449,783

(22) Filed: Mar. 3, 2017

(65) Prior Publication Data

US 2018/0253416 A1    Sep. 6, 2018

(51) Int. Cl.
*G06F 17/21* (2006.01)
*G06F 40/253* (2020.01)
*G06Q 50/18* (2012.01)
*G06F 40/30* (2020.01)
*G06F 40/279* (2020.01)

(52) U.S. Cl.
CPC .......... *G06F 40/253* (2020.01); *G06F 40/279* (2020.01); *G06F 40/30* (2020.01); *G06Q 50/184* (2013.01)

(58) Field of Classification Search
CPC .. G06F 17/2785; G06F 2216/11; G06F 17/27; G06F 17/271; G06F 17/2775; G06F 40/253; G06F 40/30; G06F 40/279; G06Q 50/184
See application file for complete search history.

(56) References Cited

U.S. PATENT DOCUMENTS 5,576,954 A * 11/1996 Driscoll ............ G06F 17/30663
5,774,833 A *  6/1998 Newman ............... G06F 17/211
                                                    704/9
5,838,323 A * 11/1998 Rose .................... G06F 17/27
                                                    715/236

(Continued)

OTHER PUBLICATIONS

"Ordinary Least Sum of Squares", published: 2015, publisher: Wikipedia, pp. 1-10 (Year: 2015).*

(Continued)

*Primary Examiner* — Wilson W Tsui
(74) *Attorney, Agent, or Firm* — Lee & Hayes, P.C.

(57) ABSTRACT

Automatic processing of documents often generates results far different from those obtained by manual human processing. For a given document processing task, many different techniques can be tried but it is often not known which will best emulate manual, human processing. This application discloses data processing equipment and methods specially adapted for a specific application: analysis of the breadth of documents. The processing may include context-dependent pre-processing of documents and sub-portions of the documents. The sub-portions may be analyzed based on word count and commonality of words in the respective sub-portions. Preambles may be identified and analyzed. The equipment and methods disclosed herein improve upon other automated techniques to provide document processing by achieving a result that is quantitatively closer to manual, human processing.

20 Claims, 11 Drawing Sheets

(56) References Cited

U.S. PATENT DOCUMENTS

| | | | |
|---|---|---|---|
| 6,266,683 B1* | 7/2001 | Yehuda | G06F 17/21 |
| | | | 707/E17.005 |
| 6,339,767 B1 | 1/2002 | Rivette et al. | |
| 6,665,656 B1* | 12/2003 | Carter | G06Q 10/10 |
| | | | 707/748 |
| 6,701,305 B1* | 3/2004 | Holt | G06F 17/30613 |
| | | | 706/12 |
| 7,814,085 B1 | 10/2010 | Pfleger et al. | |
| 8,122,043 B2 | 2/2012 | Buckley et al. | |
| 9,235,812 B2 | 1/2016 | Scholtes | |
| 9,372,923 B2 | 6/2016 | Elias et al. | |
| 9,430,756 B2 | 8/2016 | Glasgow | |
| 9,460,396 B1 | 10/2016 | Lee | |
| 9,483,551 B2 | 11/2016 | Beretich, Jr. et al. | |
| 2002/0165884 A1* | 11/2002 | Kreulen | G06F 17/30011 |
| | | | 715/259 |
| 2004/0078365 A1* | 4/2004 | Poltorak | G06F 17/2705 |
| 2004/0181427 A1* | 9/2004 | Stobbs | G06Q 50/184 |
| | | | 705/36 R |
| 2004/0220842 A1 | 11/2004 | Barney | |
| 2005/0004806 A1* | 1/2005 | Lin | G06F 17/2775 |
| | | | 705/310 |
| 2005/0261891 A1 | 11/2005 | Chan et al. | |
| 2009/0228777 A1* | 9/2009 | Henry | G06F 17/30017 |
| | | | 715/230 |
| 2010/0005094 A1 | 1/2010 | Poltorak | |
| 2011/0258227 A1* | 10/2011 | Lacasse | G06F 17/30011 |
| | | | 707/769 |
| 2011/0289096 A1 | 11/2011 | Barney | |
| 2012/0117082 A1 | 5/2012 | Koperda et al. | |
| 2012/0328187 A1 | 12/2012 | Vuleta | |
| 2013/0024448 A1 | 1/2013 | Herbrich et al. | |
| 2014/0317125 A1 | 10/2014 | Lundberg et al. | |
| 2016/0350886 A1 | 12/2016 | Jessen et al. | |

OTHER PUBLICATIONS

PCT Search Report and Written Opinion dated Apr. 25, 2018, for PCT Application No. PCT/US18/19921, 13 pages.

Quinn. "Patent Claim Drafting: Improvements and Jepson Claims." In: IPWatchDog. Mar. 29, 2012, Retrieved from: <http://www.ipwatchdog.com/2012/03129/patent-claim-drafting-improvements-and-jepson-cla ims/id=23580/>, entire document, 12 pages.

Office Action for U.S. Appl. No. 15/424,644, dated Aug. 28, 2019, Edmund, "Automatic Human-emulative Document Analysis", 19 pages.

* cited by examiner

| Claim No. 200 | Patent No. 202 | Breadth 204 | Problem 206 | Ranking 208 | Claim Language 210 | Comments 212 |
|---|---|---|---|---|---|---|
| 1 | 349,983 | 85 | 5 | 1 | A method comprising; accessing a first... | Unsupported word |
| 7 | 789,555 | 72 | 0 | 2 | A system including a processor and a memory comprising; a connection module... | Possible dependent claim |
| 1 | 948,934 | 65 | 18 | 3 | A method for remote access comprising; identifying the address... | Absolute word |
| 13 | 824,089 | 31 | 9 | 4 | Computer-readable media storing instructions comprising; determine port availability... | Possible normative language |

FIG. 2

AUTOMATIC HUMAN-EMULATIVE DOCUMENT ANALYSIS ENHANCEMENTS

CROSS-REFERENCE TO RELATED APPLICATION

This application is related to U.S. patent application Ser. No. 15/424,644 filed on Feb. 3, 2017 with the title "Automatic Human-emulative Document Analysis" which is incorporated by reference in its entirety.

BACKGROUND

The amount of information contained in documents is rapidly increasing. There are many industries such as law, education, journalism, politics, economics, etc. that may benefit from rapid and low-cost document analysis. Yet even with recent advances in artificial intelligence and computing, manual analysis still provides the best results for many document analysis tasks that involve subjective judgment and expert knowledge. However, the cost and relatively slow speed of manual, human analysis makes it effectively impossible or impracticable to perform document analysis at the scale, speed, and cost desired in many industries. "Offshoring" to take advantage of lower costs may allow the hiring of a larger number of people to analyze documents at a lower price per hour of labor. Even so, there is a lower bound on costs and an upper bound on throughput. Using multiple different people to provide manual analysis also has a strong potential to introduce inconsistencies because of variation in different individuals' subjective judgment. For example, analyzing a corpus of a million 30-page text documents overnight would be impossible using only human analysis. Automated document analysis using computers is much quicker than human analysis and performs at much lower cost. However, for analytical tasks involving subjective judgment computers perform much worse than humans. Thus, devices and methods that can analyze documents in a way that emulates human analysis will have broad application across many different industries.

SUMMARY

Documents stored in one or more data repositories may be accessed automatically by one or more computing devices and analyzed based on one or more rule sets. The format, structure, and contents of any document stored in the data repositories may be initially unknown. Thus, part of the analysis may include filtering documents from a data repository and pre-processing the documents to identify those that are suitable for further analysis and to prepare the content of the documents for analysis. Examples of document types that may be analyzed include, but are not limited to, issued patents and published patent applications. The analysis may focus on specific portions of the documents such as, for example, abstracts or patent claims. Pre-processing may modify the document portions by standardizing the content and removing content that could negatively affect subsequent analysis through techniques such as stop word removal, stemming, and removal of duplicate words. Portions of the documents may be analyzed to detect preambles by identification of an indicia that indicates transition from a preamble to a body.

Breadth of the document portions is analyzed based on consideration of word count and commonality of words. Thus, the number of unique words and the frequency with which those words appear in other document portions are the basis for automatically assigning a breadth value to a given document portion. For a given document portion, the word count is compared to the word count of other document portions in the same analysis. Similarly, a commonness score is determined for the given document portion based on the commonality of words in that document portion as compared to the commonality of words in other document portions from the same analysis. Once a portion of a document is identified as containing a preamble, text in the preamble may be processed differently such as, by example, excluding that text when determining word count or commonality of words.

If the document portion is a patent claim, the breadth value represents an automatically-estimated scope of a property right relative to other patent claims that are part of the same analysis. Thus, the document analysis is able to automatically determine that claim A is broader than claim B. The breadth value may be modified, or determined differently, based on a type of preamble contained in a document portion. For example, if a preamble includes a closed transition phrase then the breadth value may be computed or adjusted to account for the closed transition phrase. Additionally, inclusion of certain words in the document portion such as an absolute word, exemplary word, or relative word, may affect the computation, or cause adjustment, of the breadth value for that document portion. This analysis is human-emulative because the results are similar to those achieved by manual, human analysis and superior to other automatic analytical techniques.

A document portion may be evaluated based on a number of issues or "problems" found in the document portion. The problems may include, but are not limited to, things that have the potential to limit the subjective evaluation of a breadth value that would be assigned to the document portion by a human analyst. A problem score may be calculated for document portion to represent the extent of "problems" found in the document portion by automatic analysis.

Breadth scores for various document portions analyzed together may be compared to generate a ranking of the document portions based on relative breadth scores. Problem scores for various document portions analyzed together may also be compared. A user interface is generated that shows unique document identification numbers and corresponding breadth scores and/or rankings of document portions. A user interface may also show corresponding problem scores for documents and/or document portions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 2 shows one example implementation of the user interface of FIG. 1.

DETAILED DESCRIPTION

Figure 1:
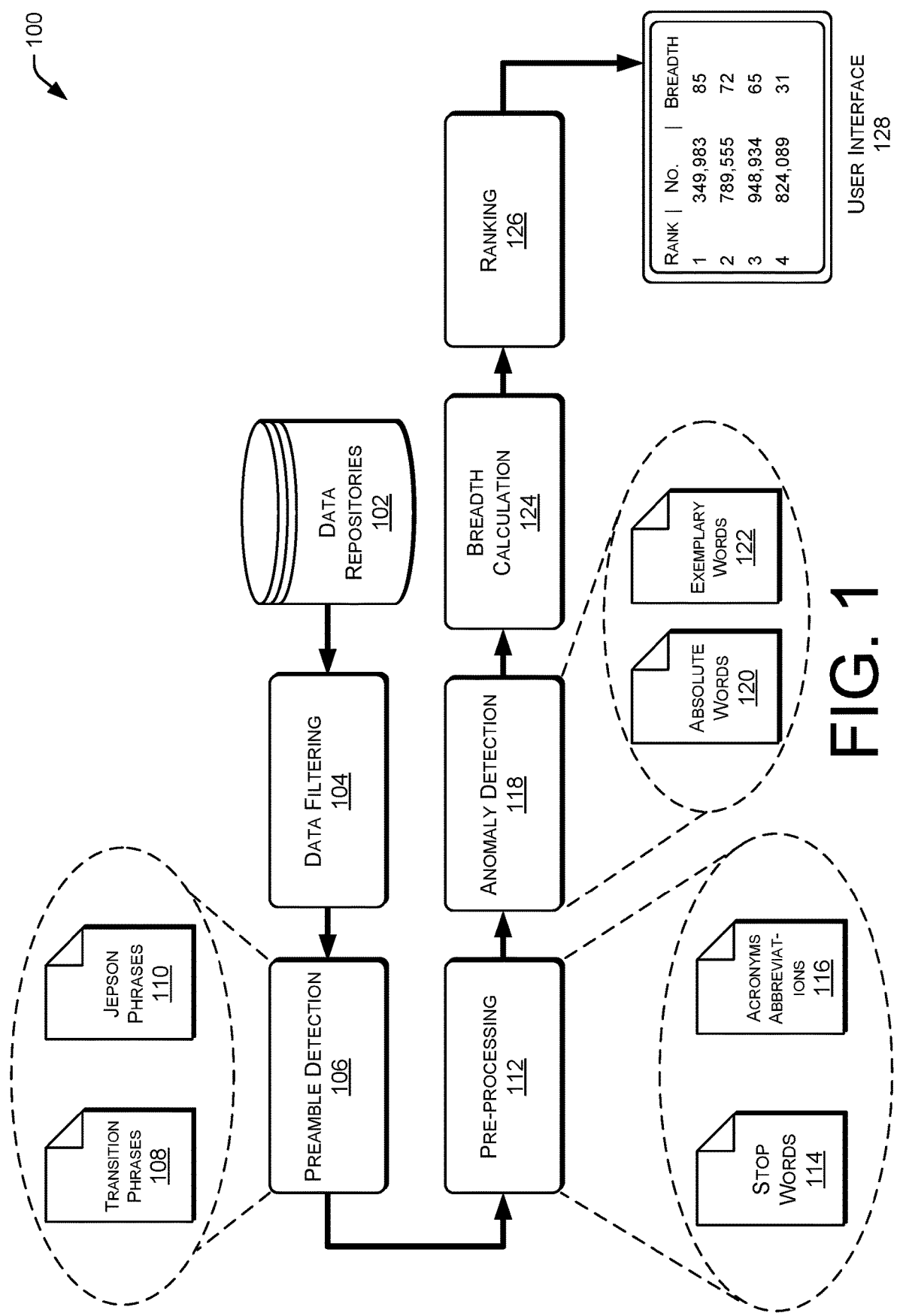
FIG. 1 shows an example processing pipeline for generating a user interface showing the results of automatic document analysis.

FIG. 1 shows an example analysis pipeline 100 for automatically analyzing and presenting breadth information derived from multiple documents. The documents may come from one or more data repositories 102. The documents may be any type of document such as issued patents, published patent applications, scholarly articles, news articles, financial statements, etc. The documents may also be available in any one of multiple different formats such as plaintext, hypertext markup language (HTML), comma separated values (CSV), or images such as portable document format (PDF) or Tag Image File Format (TIFF) files. In some document formats such as, for example, HTML and CSV portions and attributes of the documents may be individually identified. For example, the patent number may be placed in a column for patent numbers in a CSV file or labeled with a tag <patent number> in an HTML file. Similarly, the claim section may be identified as a claim section. In other file formats, such as, for example plaintext or PDF, the documents may not contain any such identifying information or metadata.

The format and/or file type of documents received from one of the data repositories 102 may be initially unknown when that document enters the analysis pipeline 100. Thus, at the start, part of the initial analysis may include identifying the file format and/or type of document. Some level of processing may be necessary for all documents and certain types of files such as image files or text files lacking metadata may require more extensive processing before further analysis can begin. In one implementation, the data repositories 102 may include both issued patents and published applications for utility, design, and/or plant patents. Patent data from various jurisdictions and in various languages may also be included in the data repositories 102. Examples of data repositories 102 include a patent database provided by Innography®, the U.S. Patent Database maintained by the United States Patent Trademark Office, patent data maintained by Relecura, as well as patent databases maintained by others such as the patent offices of various jurisdictions.

Data filtering 104 can limit the data obtained from the data repositories 102 to a corpus of documents that share specified characteristics. This may be particularly useful when the documents come from multiple different sources and/or the documents are obtained without knowledge of the document format. For example, the data filtering 104 may limit patent documents to only issued patents and exclude published patent applications. Data filtering 104 may filter by patent type and, for example, keep utility patents while excluding design and plant patents. Data filtering 104 may also filter documents by language, by author, by inventor, by assignee, by technical field, by classification, etc. Filters may be specified by user-generated input through a user interface. In one implementation, the user interface for specifying how data is to be filtered may be a command-line interface. Arguments passed on the command line are parsed by appropriate code to determine an input data set and/or filters to apply to incoming data.

Preamble detection 106 detects the presence of a preamble in a document portion and can distinguish the preamble from the remaining body of the document portion. In the context of patent claims, a preamble recites the class of the invention, and optionally its primary properties, purpose, or field. In dependent claims, the preamble references another claim and refines it, e.g., "The method of claim 1 . . . ". The body of a patent claim includes the clauses that provide limitations of the claim. Automatic document analysis processes the text of document portions following the data filtering 104 in order to identify if the document portion includes a preamble and if so to analyze the text in the preamble. Patent claims begin with preambles, thus the start of the preamble is the start of the patent claim. However, the end of a preamble is more difficult to identify automatically. Preambles in patent claims typically end with a transitional phrase and a colon. The transitional phrase characterizes the elements of the claim that follow. In English, the transitional phrase may be "comprising," "containing," or "including" as well as other options. Thus, a preamble may be automatically defined as extending from the initial text in a patent claim to the first instance of a transitional phrase, the first instance of a colon, or the first instance of a transitional phase followed by a colon. A list of transitional phrases 108 may be accessed by computing device to determine if any of the phrases included in the list 108 are present within a document portion under analysis. In an implementation, stemming may be performed on words in the document portion and the list of transition phrases 108 may identify the corresponding word stems of transitional phrases. Thus, "comprising" and "comprises" may both be identified as transitional phrases based on their word stems. The list of transitional phrases 108 may be implemented as a separate data structure or may be implemented as part of the code that performs analysis of the text. Once a preamble is identified as separate text within the document portion, the preamble may be analyzed separately. The document portion may be analyzed as a whole with consideration of the transitional phrase and other characteristics of the preamble.

Particular keywords or phrases for identifying specific types of preambles may also be used as part of preamble detection 106. For example, one type of patent claim having a specific type of preamble is a Jepson claim. A Jepson claim is drafted in a particular format beginning with a preamble comprising a general description of all the elements or steps of the claimed combination which are conventional or known, (2) a phrase such as "wherein the improvement comprises," and (3) those elements, steps, and/or relationships which constitute that portion of the claimed combination which are considered the new or improved portion. Thus, recognition of a claim as being written in the Jepson format affects the interpretation of the preamble and the calculation of breadth. A list of Jepson phrases 110 may be used to automatically recognize when a document portion is likely structured as a Jepson claim. The list of Jepson phrases 110 may include the standard transition phrase "wherein the improvement comprises." Presence of this phrase in the text of a patent claim may be sufficient to trigger the classification of that claim as a Jepson claim. The list of Jepson phrases 110 may also include other phrases associated with Jepson claims such as the word "improvement." The preamble detection 106 may classify a claim as a Jepson claim if the word "improvement" (or word stem if stemming is used) is found anywhere in the preamble. Another, slightly more restrictive, technique classifies the claim as a Jepson claim if the word "improvement" is found within a predetermined number of words (e.g., 1, 2, or 3) before the end of the preamble. For example, looking only within the predetermined number of words before the end of the preamble may avoid misclassifying claims that are not Jepson claims (i.e., "An improvement to a device comprising: . . . ").

Pre-processing 112 modifies the documents or portions of the documents for later processing. Pre-processing 112 may include stripping out punctuation, removing stop words 114, converting acronyms and abbreviations 116 to full words, stemming, and/or removing duplicate words. Stop words 114 are words that are filtered out before additional processing. Punctuation may include any of the following marks: . , ! ? , ; : ' " @ # $ % ^ & * ( ) [ ] < > / \ - — °. Use of the colon ":" for preamble detection 106 is one reason that preamble detection 106 may be performed prior to pre-processing 112. However, punctuation removal may be modified to remove all of the above characters except for the colon and then performed prior to preamble detection 106. Stop words usually refer to the most common words in a language. Stop words may include short function words such as "the" "is," "at," "which," and "on," as well as others. However, there is no universal list of stop words. Stop words 114 may be compared to individual documents or portions of the documents and any matching words removed. The stop words 114 may be included directly in the code of a pre-processing algorithm. Additionally or alternatively, the stop words 114 may be included in a list that is accessed to identify stop words 114. The list may be editable to add or remove stop words 114. Multiple lists of stop words 114 may be available. Particular stop words 114 may be selected based on the type of documents being analyzed. For example, patent specific stop words 114 may include words such as "method" or "comprising" that would not typically be included in a list of general stop words. Because some transition phrases like "comprising" may also be stop words, this is another reason that preamble detection 106 may be implemented prior to pre-processing 112. However, different stop words 114 may be removed at different points in the automated processing. For example, stop words that are not transition phrases may be removed, then preamble detection 106 may be performed, and after that stop words that are also transition phrases may be removed. If the data filtering 104 restricts the documents to a specific technical area, the stop words 114 may include words specific to the technical area.

Anomaly detection 118 identifies portions of documents that likely include an anomaly which will result in the portion of the document being excluded from further analysis or being flagged to alert a human user that there may be reasons to manually review the flagged document portion. In one implementation, the analysis may be performed only on independent patent claims. However, the data filtering 104 and the pre-processing 112 may create document portions that include both independent and dependent patent claims. When this analysis is configured to recognize characteristics of dependent patent claims as being "anomalous," anomaly detection 118 can ignore or discard the portions of the documents that correspond to dependent claims.

Due to the limits of automatic computer-based document analysis there are some characteristics which may be detectable but the automatic system will be unable to properly analyze for breadth. There may also be aspects of document portions, such as patent claims, that would cause the techniques for automatic analysis of breadth to report values different from those likely assigned by a human manually reviewing the claim language. These types of aspects may include the presence of absolute words 120 (e.g. must, critical, required, necessary, essential, important, every, only, absolutely, all, advantageous, needed, requirement, never, none, and must not). Absolute words 120 may limit claim breadth more than would be appreciated merely by analyzing word count and word frequency. Exemplary words 122, such as "e.g." and "for example," may also confound techniques for automatically analyzing breath because the words may be optional and not limit breadth. Similarly, alternative language (e.g., "or," or "at least one of") may affect breadth because all of the alternatives do not necessarily need to be considered in the breadth calculation. These specific words and or phrases may be implemented as lists that are called or referenced during processing or may be integrated in whole or in part into the code that performs anomaly detection 118. Flagging or otherwise indicating such content allows humans to focus manual review efforts on only those document portions that were not fully amenable to the automatic analytical techniques. In addition to flagging, all of the above and other types of anomalies may be accounted for and used to compute or adjust a breadth score.

Anomaly detection 118 may also involve creating a score or metric representing the extent of anomalies or "problems" present in a document portion. This "problem score" may increase based on a number of absolute words 120, exemplary words 122, relative words (e.g., sufficiently, generally, approximately, etc.), lack of detectable preamble, unsupported words in a document portion without support in the remainder of the document, or other issues. Unsupported words are words or phrases found in a document portion (e.g., a patent claim) that are not found in the remainder of the document (e.g., the detailed description of a patent document). Thus, the "problem score" for a document portion may be an indication of the extent to which that document portion should be ignored for the purposes of breadth calculation and/or the degree to which manual, human review may be necessary to properly understand the breadth of that document portion.

Breadth calculation 124 determines the breadth of a document or of a portion of a document. Breadth is a subjective concept that is represented in a form amenable for automatic analysis by considering word count and commonality of words. The breadth calculation 124 may also consider the number of words in a preamble and the classification of a preamble as a particular type of preamble (e.g., Jepson claim preamble). Word count is simply the number of words in a document or document portion. Words may be counted based on the raw input following data filtering 104 or after some level of pre-processing 112. For example, word count may be performed after removal of duplicate words so that it is a word count of unique words. Also, word count may be performed before or after removing stop words 114. Similarly, word count may be performed before or after converting acronyms and abbreviations 116 into their full word representations. The word count may also include or exclude words in the preamble. In one implementation, if a preamble is determined to be non-limiting (as discussed below) the word count does not include words in the preamble but only counts words in the body of the document portion. In the context of patent claims, short claims are generally considered broader than longer claims. And non-limiting words are not considered as affecting claim breadth, thus exclusion of words in non-limiting preambles is appropriate for automatically calculating claim breadth in some circumstances.

Commonality of words represents the frequency that a given word is found within a corpus of documents or document portions. Generally the relevant corpus is subject to the pre-processing 112. For example, if the starting documents from the data repositories 102 were academic papers on chemistry, and pre-processing limited the corpus to the abstracts of those papers then the commonality of a word would be based on the frequency that word is found throughout all the abstracts. Common words correlate with greater breadth while the presence of infrequently found words indicates reduced breadth. In the context of patent claims, words that are often found in the technical field are generally considered broader, or less limiting, than uncommon words.

The breadth calculation 124 combines both word count and word commonality to assign a breadth score to a document or document portion. The breadth score may be further computed or modified based on words or characteristics of a document portion including characteristics related to a preamble in the document portion. Breadth calculation 124 may also include reducing or penalizing a breadth score due to the presence of narrowing features in a document or document portion. Specific techniques for determining word count, word commonality, and an overall breadth score are discussed below. Some documents may have multiple portions that are scored. For example, an abstract and an executive summary of a financial document could be scored. A single patent document may have multiple independent claims and each independent claim may be assigned a different breadth score. The breadth of a document may be the breadth of its broadest portion such as the broadest claim of a patent document. Alternatively, the breadth of a document may be the breadth of its narrowest portion (e.g., the narrower of the abstract or the executive summary) or alternatively a median or average of each of the individually scored portions of the document. For example, a patent document having 20 claims may receive a score for each of the claims and the overall score assigned to that document may be the average of the 20 breadth scores. There may also be instances when less than all of the claims present in a patent document are evaluated for breadth. For example, during anomaly detection 118 it may be determined for one reason or another that a given patent claim is not amenable to analysis using the techniques for breadth calculation 124. Thus, that claim may be effectively ignored for the purposes of determining the breadth of the patent document. In some implementations, the breadth calculation 124 may evaluate a patent and/or patent application based on the claim language and terms used in the claim relative to all the other claims against which the claim is to be compared. In one particular implementation, a claim from a particular patent or application is compared to all the claims in all the patents and/or patent applications in a particular class or subclass of a classification or taxonomy system (such as USPTO classification, for example). Sub-portions of claims may also be compared to other similar sub-portions. For example, the breadth of the bodies of patent claims may be compared to other bodies of patent claims thus excluding the preambles from the relative evaluation.

The ranking 126 orders or ranks the analyzed documents. The analyzed documents may be ranked based on breadth, based on problems in the documents, or based on another metric. Breadth calculation 124 is performed within the context of the other documents in a corpus. Thus, a breadth score for document or portion of a document is not an absolute value but a relative value compared to other documents that are part of the same analysis. This design for the analysis is human-emulative because it captures the idea of comparing apples to apples. Comparison of the breadth of a biotechnology patent claim to the breadth of a mechanical patent claim is less meaningful than comparing the breadth of one software claim to another software claim. Comparison across different technology spaces may cause the commonness of a given word to have vastly different impacts on overall claim breadth scores. For example, "encryption" might be found regularly in information technology patent claims and would only have a small negative impact on claim breadth, but that same word in a biotechnology claim may be relatively uncommon and represent a more significant limitation to claim breadth. Because the documents, or document portions, are given breadth scores with respect to the other documents in the same corpus those breadth scores may be ordered to produce a ranking with, e.g., 100 being the broadest (or alternatively the narrowest).

Ranking documents based on the number and extent of anomalies detected or the level of "problems" present in a document does not necessarily depend on the context of other documents analyzed in the same corpus. Thus, a "problem score" for a given document or document portion may be the same regardless of the other documents analyzed together with that given document. Even so, a group of documents or document portions that are formed into a corpus may be ranked with respect to each other in terms of the "problem scores" for those documents. Additionally, or alternatively, various groups of documents may be ranked with respect to each other in terms of the levels of problems or anomalies present. For example, a first corpus of documents may be determined to have more anomalies and/or problems than a second corpus of documents.

Problem scores or certain types of anomalies may also cause a document portion to be excluded from the ranking. Document portions for which the system does not detect a preamble at 106 may be excluded from the ranking. A patent claim that is identified as a means-plus-function claim or as a Jepson claim may also be excluded from the breadth ranking. Also, in an implementation, document portions with problem scores above a threshold level may be excluded from the ranking because the extent of problems suggests that the automatic breadth calculation techniques would likely yield an answer that is not representative.

The user interface (UI) 128 may display, or otherwise present to a user, the breadth scores, any problem scores, the ranking, and/or an identifier for each of the analyzed documents. The UI 128 may also include additional information about a family of documents, a group of documents belonging to the same assignee, or other information. The identifier for each of the documents may be a unique identifier such as a patent number, a published patent application number, an international standard book number (ISBN), a title, a universal resource identifier (URI), etc. The UI 128 may be generated by processing a text file or other textual output. The UI 128 may be implemented as a command line interface, as a graphical user interface, or as another type of interface. When implemented as a graphical user interface, the UI 128 may be generated by a cloud service that is accessible over a communications network such as the Internet. Cloud services do not require end user knowledge of the physical location or configuration of the system that delivers the services. Common names associated with cloud services include "software as a service" or "SaaS", "platform computer", "on-dash demand computing," and so on. Any number of users may access the UI 128 any time through specialized applications or through browsers (e.g., Internet Explorer®, Firefox®, Safari®, Google Chrome®, etc.) resident on their local computing devices.

FIG. 2 shows one implementation of the UI 128 in more detail. The UI 128 may display information generated by the analysis pipeline 100 for a number of different documents or document portions. In this example the documents are issued patents and the analyzed portions are independent claims. However, the same or similar UI could display analysis of different types of documents and document portions. One illustrative type of UI is a graphical user interface (GUI) as shown in FIG. 2. A GUI is a type of user interface that allows users to interact with electronic devices through graphical icons and visual indicators such as secondary notation, instead of text-based user interfaces, typed command labels or text navigation. Actions in the GUI may be performed through direct manipulation of the graphical elements using a pointing device such as a mouse, stylus, or finger.

There is an entry for one or more documents in the UI 128 and information about those documents. The information may include broadest claim number 200, patent number 202, breadth score of the broadest claim 204, a number of problems 206 in the claim, a ranking 208 of the document relative to other documents in the corpus, claim language of the broadest claim 210, and/or comment 212 that may include description of any anomalies and/or problems detected in the claim. The UI 128 may also include interactive elements 214 associated with each of the entries. A one of the interactive elements 214 may be activated in response to a command generated on an input device to select a one of the documents. Information about the analysis of the selected document may be saved to a separate file, placed in separate portion of memory, or added to a list for later access and/or analysis.

The breadth scores 204 may be viewed as arbitrary numbers that by themselves do not have inherent meaning, but the difference in breadth score can be used to generate the ranking 206 and is an indication of the amount of variation between the breadth 204 of various patent claims or other document portions. In this example the broadest claim has a breadth score 204 of 85 and the ranking 206 of that claim is 1. One column in this UI 128 may display the claim language 210 of the broadest claim for the analyzed document. In some implementations in order to use less screen space such as on a mobile device, the column containing claim language 210 may display only a portion of the claim language or may present an operable UI element that, when activated, causes displays of the full claim language.

The problem scores 206 may also be viewed as arbitrary numbers that, in this implementation, increase as the severity or frequency of problems in the analyzed claim increase. Thus, claim 1 in the third row from U.S. Pat. No. 948,934 has a problem score of 18 which is higher than any of the other claims shown in this UI 128. Because it is difficult to quantify different types of problems to a shared numerical scale, a problem score of 18 is not necessarily twice as "problematic" as a problem score of 9. Rather the problem score provides an approximate metric by which a human analyst can use to decide which claims to examine manually. Those claims for which anomalies or problems were detected may be indicated by entries in the comments 212 column. In one implementation, the presence of any anomaly may be marked by a symbol or indicia. This indication itself may be an operable UI element that, when activated, causes display of the specific type of anomaly or problem detected. In the implementation shown by this example UI 128, the comments 212 column provides a brief description of the anomaly or problem detected in a claim.

Illustrative Methods

The methods are illustrated as a collection of blocks in a logical flow graph representing a sequence of operations that can be implemented in hardware, software, firmware, or a combination thereof. The order in which the method blocks are described and claimed is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Methods 300-900 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

Figure 3:
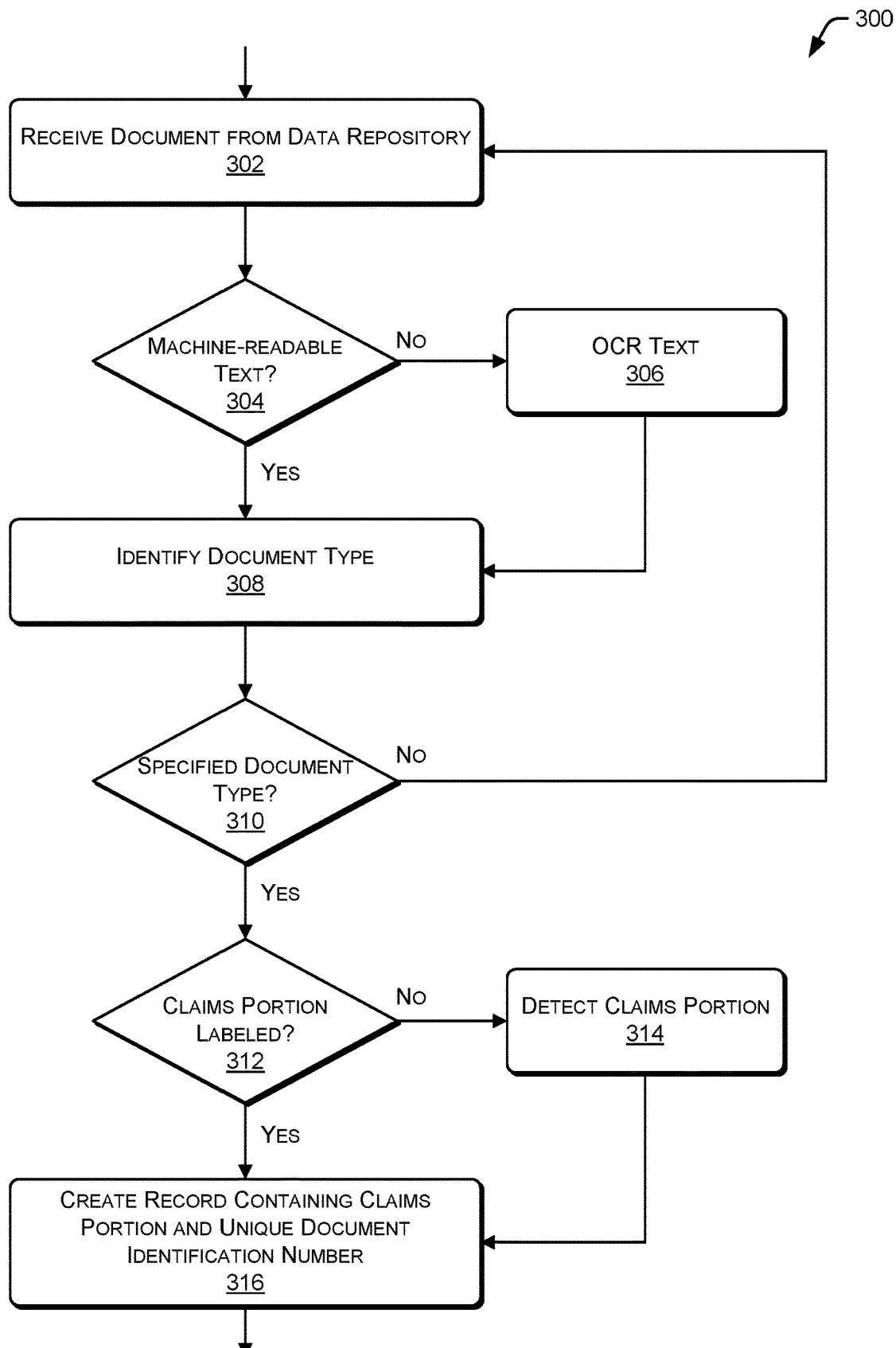
FIG. 3 is a flowchart showing an example method for filtering documents from a data repository to identify and prepare portions of those documents for analysis.

FIG. 3 is a flowchart depicting an example method 300 of filtering data that comes from one or more data repositories. For instance, a collection of patents and/or applications may be gathered from a data repository limited to a technology area. This allows the words and/or phrases to share a common ontology, vocabulary and/or taxonomy. In one implementation, the collection may be obtained based on classification codes, such as the U.S. Patent and Trademark Office (USPTO) classes and subclasses, or the International Patent Codes (IPC).

At 302, a single document may be received from a data repository for analysis. Each document in the data repository may be associated with a unique document identification number. The unique document identification number of a patent document may include an application number, a publication number, a patent number, and/or a combination of information associated with the patent document that may uniquely identify the patent document (such as a combination of a name of an inventor and a filing date, etc.).

This process may repeat until all documents in a targeted data repository are analyzed. The available data repositories may include, but are not limited to, a patent database provided and/or supported by a patent office of a particular country (e.g., a USPTO (United States Patent and Trademark Office) database, a PAIR (Patent Application Information Retrieval) database, EPO (European Patent Office) database, WIPO (World Intellectual Property Organization) database, SIPO (State Intellectual Property Office of the P.R.C.) database, etc.), and any other databases that are provided by public and/or private institutions over the world.

At 304, it is determined if the document contains machine-readable text. Some types of files available from the data repositories such as HTML documents may already contain machine-readable text. Other types of files such as PDF files representing images of paper documents may lack machine-readable text. Draft documents or unpublished documents, for example, may be available only in forms that do not include machine-readable text. The determination of whether a document contains machine-readable text may be made in part by automatic detection of file type using known techniques for file type identification including recognition of filename suffixes. If a file type is not specified by a suffix or other metadata, it may be determined by opening the file and comparing the file structure to a library of known structures associated with known file types. If a document is determined to not include machine-readable text, method 300 may proceed to 306 and optical character recognition (OCR) may be used to recognize text in the document.

At 306, OCR may be applied to the document to convert the document into a format that contains machine-readable text. OCR is the mechanical or electronic conversion of images of typed, handwritten, or printed text into machine-encoded text, whether from a scanned document, a photo of a document, or other source. OCR is a method of digitizing from imaged texts so that they can be electronically edited, searched, stored more compactly, displayed on-line, and used in machine processes such as cognitive computing, machine translation, (extracted) text-to-speech, key data and text mining. OCR involves pattern recognition, artificial intelligence, and computer vision.

At 308, document type is identified. Document type means the type of information contained in a document rather than the computer file format in which the document is encoded. Documents may include identifying information such as unique document identification numbers, kind codes, and indications of source. Unique document identification numbers may, for example, include patent numbers that can be used to distinguish between different types of patents based on the structure of the number. For example when analyzing document identification numbers coming from a database of U.S. patents, a seven digit number may be interpreted as indicating that the document is a utility patent, and 11 digit number optionally with a "/" following the first four digits may indicate a published patent application, a five or six digit number preceded by the letter D indicates a design patent, and identifiers for plant patents begin with the letters PP. Kind codes in patent documents can also indicate if a document is a utility patent, plant patent, patent application publication, statutory invention registration, or design patent. The documents to be analyzed may come from any one of a number of different data repositories. If a given data repository is known to be limited to containing only documents of a certain type, then all documents obtained from that data repository may be assumed to be of the specified type. For example, a document obtained from a data repository that only contains academic papers on biotechnology may be identified as an academic paper on biotechnology by virtue of coming from this specific data repository. Each document at this point in method 300, will contain machine-readable text and be associated with a document type.

At 310, it is determined if the document is of one or more specified document types. This filters documents based on document type. Document type(s) may be specified by user. In the absence of user specification, filtering may be performed based on a default document type. In one implementation, the default document type may be issued U.S. patents. Thus, any document that is identified as a U.S. patent either by a unique document identification number, a kind code, by coming from a particular data repository, or other technique is retained for further analysis. A user may also specify both issued U.S. patents and issued European patents in which case documents of either type would be determined to match the specified document type. However, if a document does not match the specified document type, method 300 returns to 302 and a new document is received from the data repository. This portion of method 300 may proceed automatically and continually until all documents within the one or more data repositories have been analyzed. This processing and filtering allows use of varied data repositories and allows for document analysis to be applied across multiple data repositories because there are mechanisms for converting all documents into machine-readable text and for excluding documents that do not match a specified document type.

For those documents that do match the specified document type at 310, method 300 proceeds to 312.

At 312, it is determined if the claims portion of the document is labeled. A labeled claims portion is identified as a portion of text that contains patent claims separate from other portions of a patent document. For example, a document in CSV format may have all the claims in the same column which is designated as containing claims. Alternatively, an HTML document may have specific tags on each claim indicating that is a claim and whether it is an independent or dependent claim. However, other documents such as an OCR version of a PDF document may simply contain undifferentiated text. For such documents, claims cannot be identified as such without additional analysis. This example discusses determining if a claims portion of a patent document is labeled. However, identifying specific label portions of a document is not limited to this application and may also be applied to determine of other portions of documents are separately identified such as determining which financial documents have executive summaries labeled as executive summaries.

If a document does not have a labeled claims portion, method 300 proceeds to 314.

At 314, the claims portion is detected. The specific technique for detecting claims portion may vary based on the document format. In one implementation, keyword recognition may be used to distinguish a claims portion. For example, if a page of a document includes the word "claim" or "claims" within the first line and is followed on that same page by a paragraph beginning with a number followed by a period, then that paragraph or entire page may be designated as a claims portion. Other recognition techniques may be alternatively or additionally applied. For example, any paragraph including a line ending with a semicolon may be interpreted as a claim.

At 316, a record is created from the document containing the claims portion and unique document identification number. This record may be stored as an independent file or as a portion of another file. The record may be in a different format than the format of the source document. In many implementations, the record will be stored in a memory that is both logically and physically separate from any of the data repositories. This record can be associated with the source document through the unique document identification number. The claims in the record may be distinguished as individual claims or may be an undifferentiated collection of text that represents some or all of the claims in the patent document. Thus, in the context of patent documents this record may represent the claims section of a patent document. Generation of multiple records from multiple documents can create a corpus of patent claims that are amenable for further analysis.

Figure 4:
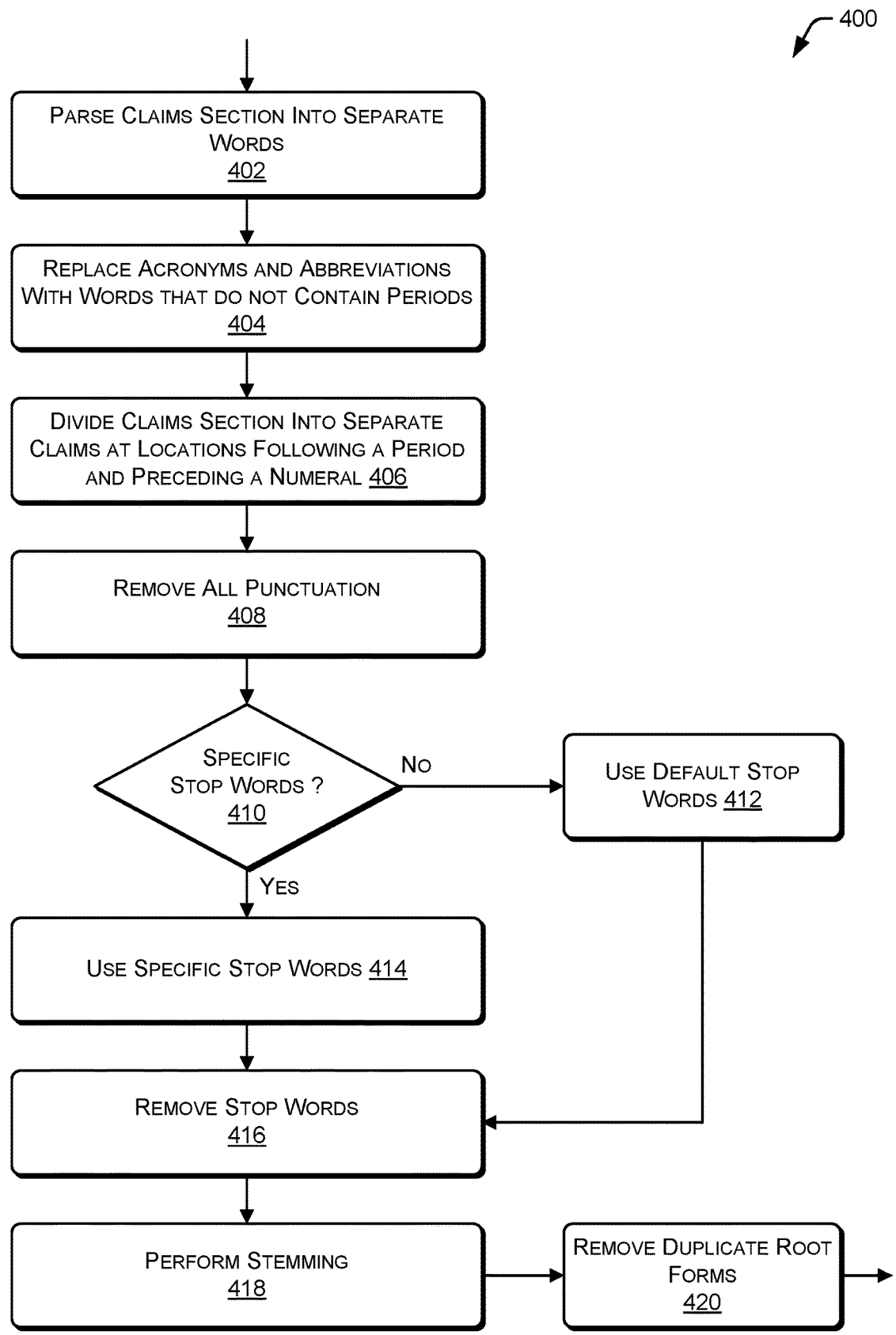
FIG. 4 is a flowchart showing an example method for pre-processing a portion of a document.

FIG. 4 is a flowchart depicting an example method 400 of pre-processing claims prior to an analysis of claim breadth. The pre-processing serves to normalize the content of the claims so that determination of claim breadth provides more consistent results. It also provides a way to customize part of the document analysis without modifying the techniques for determining claim scope.

At 402, the claims section of a document may be parsed into separate words. This divides the text of the claims section into multiple discrete words. Word parsing may be performed by identifying word delimiters and using the word delimiters to separate the text into individual words. A delimiter is a blank space, comma, or other character or symbol that indicates the beginning or end of a character string, word, or data item. In one implementation, the word delimiters are both a <space> and dash "-". Word parsing may be performed before after individual claims are distinguish from one another.

At 404, acronyms and abbreviations are replaced with alternative standardized representations. This may be performed by comparing each word from the claim section to a synonym library (e.g., a lookup table) containing known acronyms and abbreviations that are paired with alternative representations. In some implementations, the alternative representations may be fully written out words. Alternative representation may also be a standardized form that does not use periods. For example, "NASA" may be replaced with National Air and Space Administration. Similarly, "U.S.A." may be replaced by "USA" or in some implementations "United States of America." This serves to remove the periods that are found in some abbreviations and to normalize word count so that claims are not perceived as shorter merely because they use more acronyms or abbreviations. Removing periods in acronyms allows for use of the end of sentence period to be an indicator of where a first claim and a second claim begins.

At 406, the claims section maybe to be divided into individual claims. Recall that after document filtering, each record of a document may include a claim section that could potentially contain multiple claims which are not separately differentiated from each other. Although it may be relatively trivial for a human to identify different claims in a document, it can be much more difficult for an automated process to accurately parse strings of text into separate claims. With patent claims, however, this may be done by creating separation between a first claim and a second claim whenever there is a period followed by a numeral. The separation may be implemented by inserting a carriage return, line break, or other marker. This is a reasonable approximation for dividing claims because once the abbreviations with periods have been replaced with full words, the only periods present in a set of claims will be at the end of a claim. Furthermore, each claim will start with a numeral such as a number from 1-20. Therefore, any point following a period and preceding a numeral is likely a division between two claims.

At 408, once the claims have been divided into separate claims, all punctuation may be removed. Punctuation may be removed by matching against a list of punctuation and deleting any character found in the list. Removing punctuation may remove any or all of periods, semicolons, commas, hyphens, brackets, slashes, and the like. Punctuation is generally understood to not affect claim breadth. Thus, by removing punctuation, characters that will not be processed further are taken out of the text which is to be analyzed.

At 410, it is determined if there are specific stop words. Specific stop words may be based on the content of the documents being analyzed. For example, if the documents are patent documents then the specific stop words may include words that are common in patent claims and unlikely to serve to distinguish one claim from another. A patent-specific list of stop words may include words and/or phrases such as "computer readable media," "system," "machine," "comprising," and "wherein," as well as words and/or phrases that indicate statutory classes such as "method," "article of manufacture", and "composition of matter." There may be multiple patent-specific lists of stop words such as a separate list for stop words that are frequently found in preambles of patent claims. Technology specific stop words may also be used. For example, if all the patent documents being analyzed are from a same technological class or grouping, then stop words previously identified for that technology may be used. For example, "circuit" may be included in a stop list that is specific for documents describing electrical engineering.

If specific stop words are not available, then method 400 proceeds to 412 and uses default stop words. If, however, specific stop words are available, then method 400 proceeds to 414 and uses the specific stop words. Multiple sets of stop words may be used together. For example one or more specific stop word lists may be used in conjunction with a default stop word list.

At 416, stop words are removed. If multiple stop word lists are used together, then words are removed if they appear in any of the stop word lists.

At 418, stemming is performed on the remaining words. Stemming is the process of reducing inflected (or sometimes derived) words to their word stem, base or root form—generally a written word form. The stem need not be identical to the morphological root of the word; it is usually sufficient that related words map to the same stem, even if this stem is not in itself a valid root. Stemming is an additional form of normalization that removes differences between similar words such as "compare" and "comparing." There are numerous known techniques for stemming including use of a lookup table, suffix stripping, Lemmatisation, stochastic algorithms, n-gram analysis, matching algorithms, etc. In one implementation, the Porter Stemmer algorithm from the publicly available "nltk" package is used to perform stemming.

At 420, duplicate words may be removed. When duplicate word removal occurs after stemming, it is actually the duplicate root forms of the words that are removed. For example, removable of duplicates prior to stemming would leave both "adapter" and "adapted" in the text of a process claim, but following stemming the words may both be converted to the root form "adapt" and one may be removed.

Thus, the various claim sections obtained from patent documents are standardized through pre-processing by replacing acronyms and abbreviations with alternative representations (e.g., writing out in full words), removing punctuation, removing stop words, stemming, and deletion of duplicate words. This pre-processing makes the data from the data repositories more amenable to automatic analysis of claim breadth. It also strips away some of the variation that may be introduced by various patent claim drafting techniques in an effort to approximate the content of a patent claim separate from a particular writing style. Although a human analyst can identify when writing is "wordy," automatic analysis of breadth may be confounded by different writing styles and potentially score similar claims differently unless pre-processing is performed.

Figure 5:
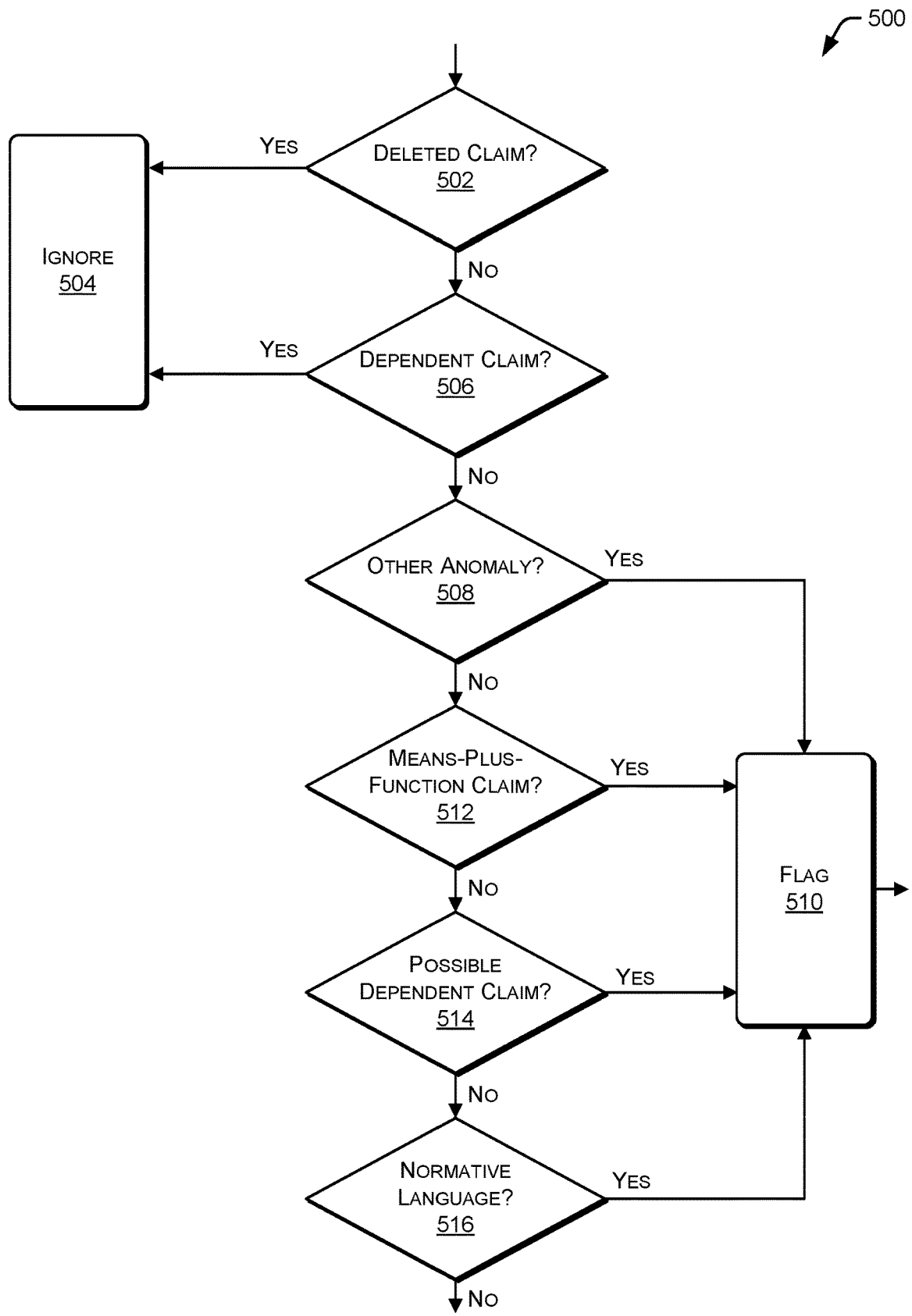
FIG. 5 is a flowchart showing an example method for determining if a portion of a document is ignored and excluded from further processing or flagged for manual review.

FIG. 5 is a flowchart depicting an example method 500 of identifying and processing claims having an anomaly. Given that automatic document analysis is not yet as effective as manual, human analysis, there may be some claim sections that proceed through document filtering and pre-processing yet are not appropriate for further analysis of claim breadth. These claims should be ignored. Additionally, even when filtering and pre-processing work as desired, there may be some characteristics of patent claims that are not properly analyzed by the techniques for automatically determining claim breadth. Rather than simply ignore these anomalies, they may be flagged or otherwise noted so that human users can evaluate the actual claim language.

At 502, it is determined if a section of a document marked as a claim contains a deleted claim. If so, method 500 proceeds to 504 and ignores the deleted claim so that is not considered in further analysis. Any document section marked having one of the following characteristics may be designated a deleted claim:
- Contains any of the words ". (canceled)", "remove", "delete", "delete.", or "deleted"
- Is less than 10 characters If a document section is not characterized as a deleted claim, method 500 proceeds to 506.

At 506, it is determined if a section of a document marked as a claim contains a dependent claim. Because dependent claims necessarily narrow the scope of an independent claim, if method 500 is implemented to identify and determine the claim breadth for a broadest claim in a given patent document, dependent claims can be ignored. Thus, for any claim found to be a dependent claim, method 500 proceeds to 504 and ignores that claim. A document section containing a claim that has any of the following words or phrases may be designated as a dependent claim:
- "claim" followed by number
- "claim" followed by roman numeral
- "according to" followed by number
- "method" followed by number
- "system" followed by number
- "of wherein"
- "step" followed by number
- "according" followed by number
- "claim to" followed by number
- "recited" followed by number
- "recited in" followed by number
- "set forth in" followed by number
- "article of <something>" followed by number
- "article of <something something>" followed by number
- "method of <something>" followed by number
- "method of <something something>" followed by number
- "claim of" followed by number
- "clam" followed by number
- "clan" followed by number
- "claims" followed by number
- "claimer" followed by number
- "claim" followed by letter/number
- "claim" followed by letter/number <comma>
- "claim"<space><comma>
- "claim"<nospace><number>
- <space>"claim"<period>
- "according to claim"
- starts with "The" instead of "A" or "An"
- "of number"<comma>"wherein"

If a document section is not characterized as a dependent claim, method 500 proceeds to 508.

At 508, it is determined if a claim has some other type of anomaly. If so, the claim is not ignored or deleted, but rather method 500 proceeds to 510 and the claim is flagged so that it can be looked at manually. The flag attached to a claim may indicate the type of abnormality detected or there may simply be an indicia showing that that an abnormality was detected. The specific type of abnormality will likely be self-evident upon manual review of the claim by a human. A claim may be designated as having some other type of anomaly if it has any of the following characteristics:
- empty string
- claim starts with a number
- starts with lowercase "a"
- starts with other lowercase letter During automatic analysis once a claim is flagged as having any type of anomaly, further anomaly detection stops. For example, claims are determined to be dependent claims are not additionally analyzed to determine if they contain means-plus-function language. This sequential processing technique saves processing power by not analyzing every claim for every potential type of abnormality. This also increases the speed at which documents are automatically analyzed because there are fewer processing loops. If, at 508, a claim does not have any other anomalies, method 500 proceeds to 512.

At 512, it is determined if the claim is a means-plus-function claim. Means-plus-function claims may be recognized by the presence of a <space> followed directly by "means" in the language of the claim. Means-plus-function claims may also be recognized in some implementations by any of:
- "step to"
- "step for"
- "configured to"
- "so that"
- "mechanism for"
- "module for"
- "device for"
- "unit for"
- "component for"
- "element for"
- "member for"
- "apparatus for"
- "machine for" or
- "system for"

Any or all of these indicators of means-plus-function status may be stored in a list or look-up table. Additionally, any claim that includes a nonce word without sufficient structure may also be deemed a means-plus-function claim. A nonce word is a word that substitutes for "means" without a generally recognized structural meaning. One example of a "nonce" word is the word "module." New nonce words are identified by review of patent documents by the patent office and the courts. Thus, words which may be considered nonce words is changing. Relevant court decisions may be reviewed to identify new nonce words and a list of nonce words may be updated. Claims containing such nonce words may then be classified as means-plus-function claims. Claims identified as means-plus-function claims are flagged because the scope of such claims is based on definitions provided in the specification of the patent document so a determination of claim breadth based on word count and word frequency and the claim may be an inaccurate representation of the true claim breadth. If the claim is a means-plus-function claim, method 500 proceeds to 510 and the claim is flagged. However, if not, method 500 proceeds to 514.

At 514, it is determined if a claim is a possible dependent claim. A possible dependent claim is a claim that may be dependent but the automatic analysis is not confident enough to mark the claim as "dependent" and ignore it for the purposes of further analysis. Therefore, the claim is flagged so that it may be manually reviewed and determined if it is in fact a dependent claim and should be ignored. A claim having any of the following characteristics may be designated as a possibly dependent claim:

<number><comma>"wherein"

contains a number anywhere within

If a claim does not have any of the above characteristics, method 500 proceeds to 516.

At 516, it is determined if a claim contains normative language. Normative language in a claim is language that indicates a statement about how things should or ought to be as opposed to merely descriptive language. The presence of normative language may confound techniques for automatically determining claim scope because normative language has the potential to indicate features in the claim which are not truly limiting of the claim breadth. Presence of any of the following words or phrases in a claim may suggest normative language:

"must not"
"required"
"shall not"
"shall"
"could not"
"cannot"
"ought not"
"ought"
"has to"

If a claim contains normative language, method 500 proceeds to 510 and flags the claim. However, if a claim does not include normative language, the claim is not flagged and any result from subsequent analysis is presented to a user without a flag or other indicia of abnormality. Any claim flagged at 510 also proceeds to further analysis, but the results of the analysis of that claim are associated with a flag and/or a description of the abnormality. One example of this flag or description is the comments column 212 of user interface 128.

In an implementation, a patent claim or other document portion may be evaluated for anomalies by detection of each of the potential anomalous features described above. Thus, for example, rather than identifying a claim as being a dependent claim and then ceasing further analysis, their dependent claim may be further analyzed to determine if it is a mean-plus-function claim, contains normative language, or has another type of anomaly. A claim or other document portion may be analyzed to determine if it is a deleted claim at 502 to determine if it is a dependent claim at 506, to determine if there any other anomalies present at 508, to determine if it is a means-plus-function claim at 512, to determine if it is a possible dependent claim at 514, and also to determine if it contains normative language at 516.

Figure 6:
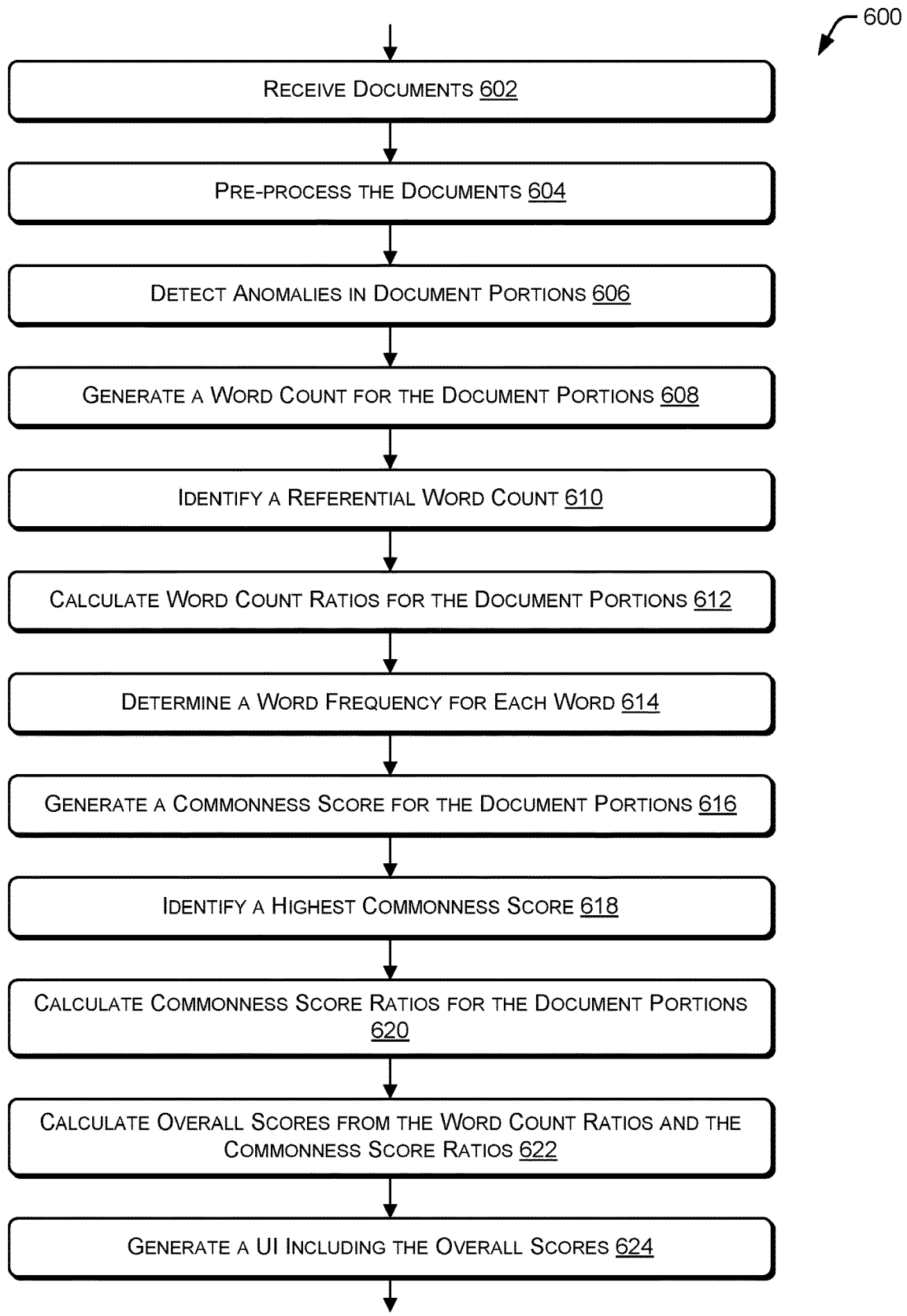
FIG. 6 is a flowchart showing an example method for automatic processing of documents to generate a user interface.

FIG. 6 is a flowchart depicting an example method 600 of automatically processing documents to generate a UI that shows overall breadth scores for the documents. Portions of method 600 may be the same or similar to portions of methods 300-500 described above.

At 602, a plurality of documents is received. The documents contain text either in computer-readable form or otherwise and each document is associated with a unique document identification number. This unique document identification number may be used to label the document as well as any sub-portions of the document. For some documents, specifically patent documents, the unique document identification number may be a patent number or a patent application publication number. The plurality of documents may be received from one or more data repositories such as the data repositories 102 show in FIG. 1. The received documents may be stored locally in a memory device separate from the data repository that provided the documents.

At 604, the plurality of documents are pre-processed to generate one or more processed document portions for each of the plurality of documents. The pre-processing may use all or part of the method described in FIG. 4. Thus, a processed document or a processed document portion refers to the document or portion thereof following pre-processing. In some implementations, the pre-processing itself may divide a document into two or more processed document portions. For example, when analyzing text containing patent claims, the document may be divided into document portions (e.g., individual patent claims) at locations following a period and preceding a numeral. Each portion of the document is associated with the unique document identification number of the source document. For example, each patent claim from a patent would be associated with the patent number. The processed document portions include a portion of the text from the source document. The specific pre-processing techniques may include parsing text to separate words, removing stop words, removing duplicate words, and removing punctuation. Some or all of the stop words may be specific to a document classification of the plurality of documents. For example, if all of the plurality of documents are associated with the same patent classification, and there are specific stop words for that classification, then those specific stop words may be used instead of or in addition to general stop words. In some implementations, pre-processing may include additional pre-processing techniques such as replacing abbreviations and/or acronyms with the corresponding full words.

At 606, anomalies are detected in the document portions. The detection of anomalies may proceed according to a method that is the same or similar to method 500 shown in FIG. 5. Many anomalies may be detected based on anomalous words or phrases that are characterized as suggesting the presence of an anomaly. One type of anomaly is the presence of normative language, and this may be detected by the presence of normative words in a document portion.

One result of anomaly detection may be excluding the processed document portion from further analysis. Certain anomalies may indicate that the processed document portion is not suitable for further analysis. Assumptions made in the design of the subsequent analysis may cause inaccuracy or irrelevant results if the analysis is applied to document portions with certain types of anomalies.

Another result of anomaly detection is flagging the processed document portions that are determined to have an anomaly. Further analysis may proceed in the same way for flagged document portions as well as for unflagged document portions. But the flag or other indicia of an anomaly allows a human to review the analyzed document portion and determine how, if at all, to account for the anomaly.

At 608, a word count is generated for each of the processed document portions by counting a number of separate words in the respective document portions. This may be performed after pre-processing so that stop words and duplicate words are omitted from the count. A word count performed after removal of duplicate words is referred to as a word count of unique words. Each document portion (e.g., patent claim) is associated with a word count which is an integer.

In an implementation, the word count of a processed document portion may be modified due to the presence of logical alternatives in the text of the processed document portion. If there are multiple alternatives separated by "or" or "and/or" only one of the alternatives may be counted for the determination of the word count. For example, a patent claim that recites "wherein the criterion is average ambient temperature, sea surface temperature, salinity, or barometric pressure" is limited by only one of the four criteria not all four. This example phrase includes 14 words but can be reduced to the five-word phrase "wherein the criterion is salinity" by removal of alternatives. Thus, failing to account for alternatives when determining word count may make a document portion appear narrower than actually is. To account for the presence of alternatives a list including "or" or "and/or" may be segmented based on commas "," and the word count of the shortest alternative may be used rather than the word count of the entire phrase including all the alternatives.

At 610, a referential word count is identified. The referential word count is a number but not necessarily an integer. The referential word count is based on a characteristic derived from the word counts of the individual document portions under analysis. The referential word count may be the word count of the document portion having a largest word count out of all the analyzed document portions. Alternatively, the referential word count maybe the word count of the document portion having a shortest word count out of all the analyzed document portions. Other characteristics may also be used to generate the referential word count such as the average or median word count of the analyzed document portions. For example, if the analyzed document portions are patent claims, then the referential word count may be the word count of the longest patent claim, the word count of the shortest patent claim, the average word count of all the analyzed patent claims, the median word count of all the analyzed patent claims, or some other metric. The referential word count is the same for all document portions analyzed together in the same corpus. However, due to the different characteristics of each corpus of documents analyzed, the referential word count will be different in different analyses.

At 612, word count ratios are calculated for the document portions. A word count ratio is the referential word count divided by the word count for a particular document portion. Thus, each analyzed document portion will be associated with a word count ratio. The numerator is the same for each document portion in a given corpus but the denominator is different depending on the individual word count of that document portion. For example, if the word count for a given document portion is 25 and the referential word count is 72 (e.g., the longest word count of all the analyzed document portions) then the word count ratio for that particular document portion is 72/25 or 2.88.

At 614, a corpus-based word frequency is determined for each word included in any of the document portions. Word frequency is specific to the word not the document portion in which the word is found. Word frequency may be thought of as a measure of how common a particular word is throughout all of the analyzed document portions. Word frequency is determined by counting how many times a word appears in all of the analyzed document portions. Thus, word frequency represents the number of instances that a word is found across the entire set of content under analysis prior to removal of duplicate words. For example, if the corpus of documents being analyzed includes 1000 patents, those patents each have on average 20 patent claims, then there will be 20,000 document portions under analysis. The number of times a given word such as "machine" appears throughout all 20,000 document portions is that word's frequency. Words that are common in a particular corpus will have higher word frequency values and words that are uncommon in the particular corpus will have lower word frequency values. Thus, at this point each document portion is associated with a word count and each word (which necessarily includes the words in each document portion) is associated with a word frequency.

At 616, a commonness score is generated for the processed document portions. Each document portion may be associated with its own commonness score. The commonness score is based on the frequency that the individual words in a particular document portion are found throughout the entire corpus of document portions under analysis. Thus, the commonness score for a document portion is based on the word frequencies of the words in that document portion. In one implementation, the commonness score for a processed document portion is based on the square root of the sum of the squares of the inverse of the word frequency for each one of the separate words in that processed document portion. Thus, the commonness score (cs) for document portion having words 1 to n each with an associated word frequency represented by $wf^1$ to $wf^n$ may be calculated by the following equation:

$$\text{commonness score} = \sqrt{\left(\left(\frac{1}{wf^1}\right)^2 + \left(\frac{1}{wf^2}\right)^2 + \ldots + \left(\frac{1}{wf^n}\right)^2\right) \times 100} \quad (1)$$

With this calculation a document portion that has more common words will receive a lower commonness score and a document portion that has more uncommon words will receive a higher commonness score. In this manner, commonness score represents an underlying assumption or premise that patent claims with more common words tend to be broader than claims with less common words. This may not always be the case, but is a useful generalization for automatic document analysis.

At 618, the highest commonness score is identified out of all of the processed document portions undergoing analysis. The commonness scores for each of the document portions maybe calculated, sorted, and then the highest of those is stored as the highest commonness score. This represents the score of the document portion that is the "most common" based on the frequency and number of words included in that document portion. Thus, every other document portion will have a commonness score that is lower than the highest commonness score.

At 620, commonness score ratios are calculated for all of the processed document portions. Commonness score ratios are calculated by dividing the highest commonness score by the commonness score for individual ones of the processed document portions. Thus, the document portion with the highest commonness score (the "most uncommon" words) has a commonness score ratio of 1 (i.e., it is divided by its own commonness score value). While, a document portion with half the highest commonness score (fewer "uncommon" words and more "common" words) has a commonness score ratio of 2. As the set of words in a document portion become more "common" the commonness score ratio increase. Thus, a higher commonness score ratio indicates more "common" or frequent words in a processed document portion. In the context of patent claims, commonness ratio represents an underlying assumption or premise that claims with fewer unique words tend to be broader than claims with more unique words, and thus, the commonness score ratio increases as the words in claim become more common.

At 622, overall scores are calculated from the word count ratios and the commonness score ratios. The overall scores may be calculated by taking a square root of the sum of the square of the word count ratio (wcr) and the square of the commonness score ratio (csr) for the individual ones of the processed document portions. The relative weights of the word count ratio and the commonness score may be normalized. One technique for normalization is to set the highest respective values for both word count ratio and commonness score ratio to 100. If, for example, the highest word count ratio is h-wcr, then all of the wcr for the corpus will be multiplied by 100/h-wcr. Similar normalization may be performed for the commonness score ratio using the highest commonness score ratio (h-csr). Of course normalization values other than 100 may be used such as 1000, 500, 50, 10, etc. Both are numbers but the relative effect on an overall score (e.g., claim breadth) may not directly correspond to the respective numerical values. For example, a word count ratio of 10 may have more or less impact on ultimate breadth than a commonness score ratio of 10. However, without normalization both contribute equally to the overall score. Thus, the word count ratio may be weighted by a first normalization value K (e.g. 100/h-wcr) and the commonness score ratio may be weighted by a second normalization value L (e.g., 100/h-csr). When written in an equation:

$$\text{Overall Score} = \sqrt{K(\text{wcr}^2) + L(\text{csr}^2)} \quad (2)$$

Thus, each document portion may be assigned its own overall score. The overall scores may be thought of as measuring the breadth of the document portions because the overall scores are based on measures of word count and word commonness. This technique for determining an overall score also moderates each of the underlying assumptions or premises behind the word count ratio and the commonness ratio. For example, if a patent claim is relatively shorter, but uses very uncommon terms, a patent practitioner might still consider the claim to be narrow due to the restrictive language in the claim. By defining overall score based on these two underlying assumptions, even shorter claims may be ranked not quite as broad if they use terms that are considered limiting or distinctive within a class in which an ontology is well developed.

If a document has multiple document portions that are analyzed, such as a patent document having multiple independent claims, the document may be assigned a single overall score based on the overall scores of one or more of the document portions. The overall score attributed to the document may be the highest, the lowest, the average, or the median, of the respective overall scores of the document portions. Assigning a single score to a document enables the system to rank order, for example, patent documents relative to one another in terms of claim breadth. If one or more of the document portions is excluded from consideration or if it is not possible to calculate an overall score for that document portion, then the overall score of the document may be based on the scores of the other document portions.

For example, if the document portions are patent claims and one of the patent claims is a means-plus-function claim it may have a high overall score because of the word count and word frequency. However, due to the limitations of the mean-plus-function format of claiming, comparing such a claim to a claim drafted in another format would be an unequal and potentially unduly favorable comparison. Thus, by excluding the means-plus-function claim, the overall score for the document could be calculated based on the other claims. For example, the claim with the second highest overall score (after the means-plus-function claim) may be used as the basis for the overall score of the patent document.

Due to the processing efficiencies obtained by using automatic computer-based analysis, in some implementations the pre-processing at 604, the detecting of anomalies at 606, the generating of word counts at 608, the identifying referential word counts at 610, the calculating of word count ratios at 612, the determining of word frequencies at 614, the generating of commonness scores at 616, the identifying the highest commonness score at 618, the calculating of commonness score ratios at 620, and the calculating overall scores at 622 are performed at a rate much faster than can be achieved through human analysis. For example, this analysis may proceed at a rate of more than one document per minute, more than one document per 30 seconds, more than one document per 10 seconds, or another rate. This is a rate much faster than can be achieved by manual, human analysis. Although the subjective evaluation of an knowledgeable expert will likely provided a better measure of breadth (and also use a different less formulaic way of determining breadth than a computer) it will be much slower. The advantage in speed gained by an automated process is countered by a loss in accuracy. Therefore, one way of comparing various automatic techniques for document analysis is by identifying which technique best emulates the analytical results achieved by manual analysis.

At 624, a UI is generated that includes one or more of the overall scores. The UI may be generated such that an overall score for one of the processed document portions is displayed in proximity to the unique document identification number associated with that processed document portion. For example, the overall score for an independent patent claim may be displayed next to the patent number. Additionally, generation of the UI may include generation of indicia indicating results from the detection of anomalies during detection of anomalies at 606. The indicia may be flags indicating that an anomaly was detected. Alternatively or additionally the indicia may be a description of the type of anomaly.

In an implementation, the UI may be a textual UI or a command-line interface that displays a line of text including the overall score, the unique document identification number, and the indicium of anomalies. In an implementation, the UI may be similar to the UI 128 shown in FIGS. 1 and 2. The UI may include information on only one processed document portion either to highlight a particular document (e.g., one having a highest overall score out of all the documents in the analyzed corpus), due to limitations of screen real estate such as on mobile devices, to minimize a volume of data transmitted across a network, or for other reasons. Alternatively the UI may display information on a one or all of the processed document portions. The UI may display information on a sub-set of the processed document portions that have a common secondary data field such as assignee. In some implementations, there may be a large number of overall scores, such as when thousands of document portions are analyzed, so the UI may include scrolling or other functionality that allows a display device to show different portions of the UI in response to user commands.

Figure 7:
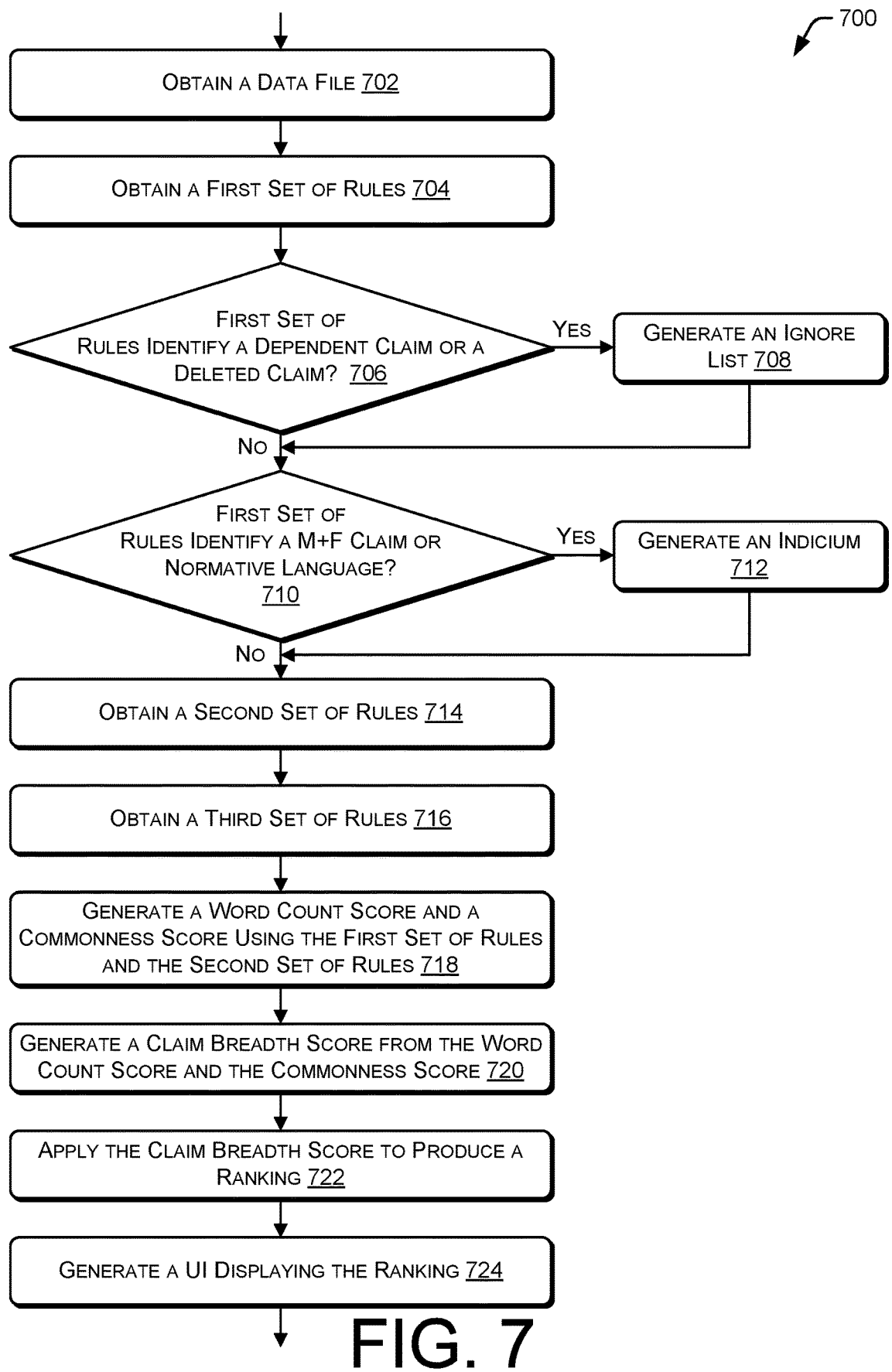
FIG. 7 is a flowchart showing an example method for automatically processing data files according to multiple sets of rules.

FIG. 7 is a flowchart depicting an example method 700 of automatically assigning a claim breadth score to a patent claim by applying multiple sets of rules. Portions of method 700 may be the same or similar to portions of methods 300-500 described above.

At 702, a data file is obtained. In an implementation, the data file may be obtained from one of the data repositories 102 show in FIG. 1. The data file may alternatively be obtained from local storage or another storage device besides one of the data repositories. The data file may include a corpus of patent claims and may be an issued patent or a published patent application.

At 704, a first set of rules is obtained. Obtaining the first set of rules may include loading the first set of rules into random-access memory (RAM). The first set of rules defines an anomalous patent claim. The anomalous patent claim may be a dependent patent claim, a deleted patent claim, a means-plus-function patent claim, a patent claim with a closed preamble, a patent claim containing absolute words, or a patent claim containing normative language. Anomalous patent claims may be identified using a technique that is the same or similar to method 500 shown in FIG. 5.

At 706, it is determined if the first set of rules identifies a dependent claim or a deleted claim. If so, when a patent claim is determined to be a dependent claim or a deleted claim, method 700 proceeds to 708 and generates an ignore list including that claim. Out of the corpus of patent claims, all pending claims identified as dependent or deleted may be included in the ignore list. In an implementation, further analysis such as generation of a word count score and commonness score is not performed for any claims included in the ignore list. This reduces unnecessary computations and makes the processing faster as compared to a technique that generates word count scores and/or a commonness scores only to later ignore those scores.

If, at 706, a claim is not identified as a dependent claim or a deleted claim by the first set of rules, then method 700 proceeds to 710.

At 710, it is determined if the first set of rules identifies a means-plus-function claim or a claim containing normative language. If the first of rules does so and a given claim is identified as either a means-plus-function claim or a claim containing normative language, then method 700 proceeds to 712 and generates an indicium of abnormality. The indicium of abnormality may be a flag stored in a data file associated with a given patent claim. The flag may be used to generate an indicium of abnormality that is displayed on a UI, such as the anomalies 210 shown in FIG. 2.

Each claim obtained from the data file at 702 is analyzed according to the first set of rules and either ignored, associated with an indicium of abnormality and retained for further analysis, or neither but only retained for further analysis.

At 714, a second set of rules are obtained. Obtaining the second set of rules may include loading the second set of rules into RAM. The second set of rules defines a word count score for a patent claim as a function of a word count in the patent claim. In one implementation, the second set of rules may include a second rule defining the word count score as based on a number of words in the patent claim following pre-processing. The pre-processing may be the same or similar to the pre-processing shown in FIG. 4. The pre-processing may include any of stemming, removal of duplicate words, removal of stop words, as well as other processing techniques.

In an implementation, the word count score may be determined by a ratio of a number of words in a high-word count patent claim to a number of words in the patent claim being analyzed. The high-word count patent claim is the one claim out of the corpus of patent claims under analysis that has the largest number of words following the pre-processing. The word count of the patent claim being analyzed is the number of words in that claim following pre-processing. If pre-processing includes removal of duplicate words, then the word counts are counts of unique words.

At 716, a third set of rules are obtained. Obtaining the third set of rules may include loading the third set of rules into RAM. The third set of rules define a commonness score for the patent claim as a function of the frequency with which words in that patent claim are present in the corpus of all patent claims under analysis. The third set of rules may include a third rule defining the commonness score as based on a per-claim commonness score. The per-claim commonness score may be calculated by a square root of a sum of, for each word in the patent claim following pre-processing, the square of the inverse of a global word count for each word. In an implementation, the second rule may define the commonness score according to equation 1 above. The global word count represents a corpus-based count of the number of times that word appears in any patent claim within the corpus under analysis. The global word count may be based on word counts prior to removal of duplicate words during pre-processing. The global word count may be performed for stop words as well. However, reduction of time and associated computation costs may be achieved by removing stop words prior to calculating global word counts for the remaining words.

In an implementation, the commonness score may be a ratio of the per-claim commonness score of a high-commonality patent claim to the per-claim commonness score of the patent claim being analyzed. The high-commonality patent claim is the patent claim in the corpus of patent claims with the largest per-claim commonness score. This representation of commonness score considers not just the word count in the individual claim and other claims but also considers how the "commonness" of words in a given patent claim compares with the "commonness" of other patent claims in the same corpus.

At 718, a word count score and a commonness score are generated using the second and third set of rules. The second and the third set of rules may be applied to all of the patent claims in the corpus under analysis to obtain word count scores and commonness scores for each of those patent claims. This creates new data resulting from application of the second and the third set of rules. This new data may be stored in association with the corresponding patent claims. Thus, for example patent claim 1 from U.S. Pat. No. 8,000,000 may be associated with a first integer representing word count score and a second floating-point number representing a commonness score.

At 720, a claim breadth score is generated from the word count score and the commonness score. The claim breadth score may be calculated by square root of the sum of both the square of the word count score and the square of the commonness score. The relative impact of the word count score and of the commonness score may be modified by weighting the raw score values to create weighted scores. This may be repeated for each patent claim under analysis so that each patent claim is now associated with a new piece of data representing an associated claim breadth score. In an implementation, the claim breadth score may be generated by equation 2 above.

At 722, the claim breadth score is applied to produce a ranking result. Given that each patent claim is associated with a claim breadth score, the values of those scores may be used to produce a ranking of the patent claims in a corpus. The ranking may be implemented by creating a sorted list from the values of the claim breadth scores. In some implementations, the data may be placed in an array, allowing for random access, rather than in a sorted list. Example sorting algorithms that may be used include merge sort, heapsort, binary tree sort, block sort, odd-even sort, and the like.

In 724, a UI is generated displaying the ranking generated at 722. The ranking shows the claim breadth score of the patent claim under analysis. The UI may also display other claim breadth scores of other patent claims from the same corpus. Additionally, the UI may display patent numbers associated with one or more of the individual patent claims. In some implementations, the UI may be the same or similar to the UI 128 shown in FIGS. 1 and 2. The UI may also be a command-line interface that shows the breadth scores, rankings, and any associated patent or application numbers as one or more lines of text.

Figure 8:
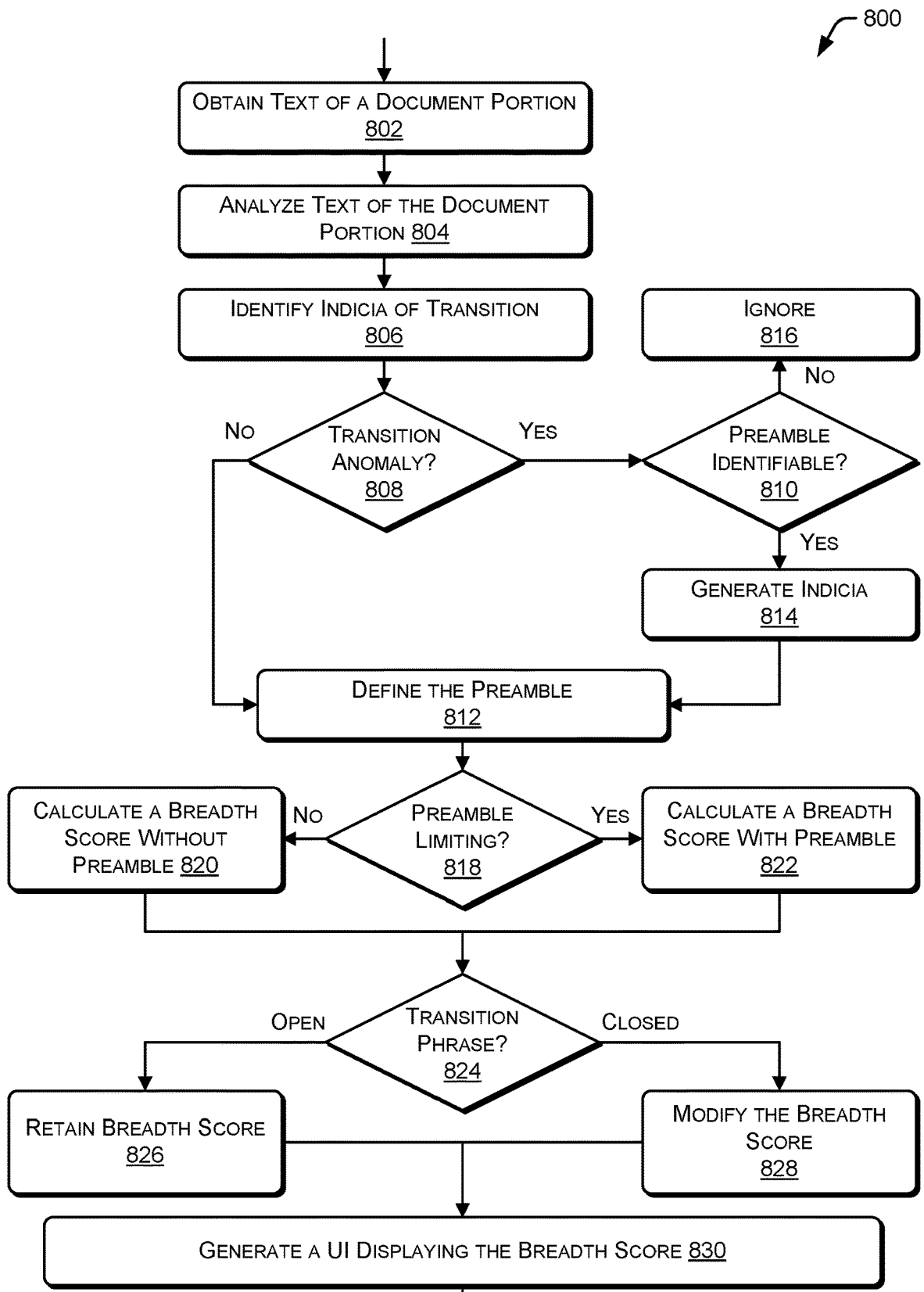
FIG. 8 is a flowchart showing an example method for identifying and analyzing a preamble in a document portion.

FIG. 8 is a flowchart depicting example method 800 of automatically detecting a preamble in a document portion and analyzing the preamble. Portions of method 800 may be performed before or after any of the methods 300-700 described above.

At 802, the text of a document portion is obtained. The text of the document portion may be obtained as part of a data file that contains one or more documents. The data file may be obtained, for example, from the data repositories 102. The text of the document portion may also be obtained following processing so that it has been separately identified and distinguished from other parts of the document. In one implementation, the text of the document portion may be a patent claim and it may be obtained once the individual patent claim has been identified as a patent claim within part of a larger document such as a patent or patent application. Obtaining the text of the document portion may include loading the text into local storage for subsequent analysis.

At 804, the text in the document portion is analyzed. The text may be analyzed by detecting ASCII characters and/or partitioning the text into words.

At 806, an indicia of transition is identified in the text. The indicia of transition is a character or characters in the text that indicate a transition from a preamble to a body. The indicia transition may be a colon ":", a transition phrase, or transition phrase followed by a colon. The transition phrase may be, for example, "comprising" or "consisting of." The indicia of transition marks the end of the preamble in the document portion and the beginning of the body of the document portion.

At 808, it is determined if the transition is anomalous or not. The text of the document portion may not have a preamble that is easily identifiable by this automatic technique. For example, if the system is unable to identify an indicia of transition it will be difficult to determine where the preamble ends and the body begins. A typical patent claim may include the phrase "comprising:" which can be readily identified because it contains a transition phrase, a colon, as well as the order combination of a transition phrase followed by a colon.

However, due to a typographical or character recognition error the preamble may end with a semicolon instead of a colon. If there is only a single transition phrase in the text, then the transition phrase may be used to identify the indicia of transition. There may also be patent claims that include multiple colons such as one at the end of the preamble and one used for a list in the body of the claim. In this instance, the first colon found in the text may be appropriate to use as indicating the indicia of transition. However, a colon could be placed in the middle of a preamble as well as at the end (e.g., A 3:2 compression pump comprising: . . . ) Thus, use of the transition phrase may be a better indicator of the indicia of transition in some circumstances.

Patent claims may also include multiple transition phrases either in the preamble (e.g. A flotation device consisting of multiple gas reservoirs each comprising: . . . ) or in the body of the patent claim describing a sub element. Thus, for some patent claims using the first transition phrase found in the text could incorrectly identify the end of the preamble. In this example, use of the colon as a condition a transaction would provide more accurate results.

However, text that is being analyzed to identify indicia of transition 804 and 806 may include no colons, more than one colon, no transition phrases, and/or more than one transition phrase. If there is something anomalous regarding identification of the indicia of transition, method 800 may proceed to 810 and determines if a preamble can be identified automatically. If there are no transition anomalies at 808, method 800 proceeds to 812.

At 810, it is determined if the preamble is identifiable even with the anomaly. Depending on the type of anomaly, it may still be possible to define a portion of the patent claim as a preamble. However, in other instances it may not be possible to identify an indicia of transition and therefore it may not be possible to identify a preamble.

If a patent claim includes multiple colons and multiple transition phrases it may be difficult to identify which one is the appropriate indicia of transition. Use of a transition phrase followed by a colon may provide a good result in many instances because the text of most patent claims will likely include this particular combination of words and punctuation only once. For the purposes of automatic analysis, a transition phrase followed by a colon includes the ":" character coming immediately after the transition phrase without a space in between and, to account for typographical errors and character recognition errors, the ":" character following the transition phrase with one or more spaces in between the two. If a preamble can be identified, method 800 proceeds to 814.

At 814, an indicia due to the transition abnormality is generated. The indicia indicates that something is anomalous and may serve as a flag to indicate the potential problem for a human reviewer.

It may not be possible to identify a preamble if a patent claim contains no colons and no recognized transition phrases. Additionally, there may be no single combination of a transition phrase followed by a colon in the text of the patent claim, making it difficult to identify where the preamble ends and further analysis of the preamble may cease. For patent claims that contain this type of text, it may not be possible to automatically identify a preamble in which case method 800 proceeds to 816.

At 816, the document portion is ignored regarding further preamble-specific processing. Other analysis of the text such as determining a breadth score as discussed above may continue or be precluded. Though not shown, as at 814, an indicia due to the transition anomaly may be generated and may serve as a flag to indicate the potential problem for a human reviewer.

At 812, the preamble is defined as the start of the text up to and including the indicia of transition. Thus, the preamble may include everything from the beginning of the text that is identified as the patent claim, or other document portion, up through the colon or transition phrase. Once defined, the preamble may be analyzed separately from the remainder of the claim.

At 818, it is determined if the preamble is limiting or not. A preamble of a patent claim may or may not limit the breadth of that patent claim. In general a preamble is found to be limiting if it breathes life and meaning into the claim. However, this subjective standard is difficult to apply in an automated document analysis system. In terms of automatic analysis, a preamble may be determined to be limiting if the claim is a Jepson claim, the preamble includes more than a threshold number of words, or the preamble introduces one or more terms that are later used in the body of the claim. Identification of a Jepson claim is as described above. A preamble having more than a threshold number of words may suggest that the preamble is likely to have an effect on the scope of the claim, and thus, should be considered limiting. The threshold number of words may be any number such as 15, 20, 25 etc. In some implementations threshold number may be input by a user at or shortly before the time of analysis. A preamble that introduces terms which are later used in the body of the claim may provide antecedent basis for terms in the body of the claim which is one indication that a preamble is limiting. For example, the preamble may recite "a recycled green widget" and the body of the claim may include the term "the widget." Thus, because the widget is understood as being recycled and green due to the preamble, the preamble is limiting. If it is not possible to determine whether the preamble is limiting or not, the analysis may characterize the preamble as non-limiting by default.

If the preamble is determined to not be limiting, method 800 proceeds to 820 and a breadth score is calculated without use of the preamble for at least one of the word count or the commonness score. The word count and the commonness score for text of the document portion under analysis may be determined in a similar manner as shown in FIG. 6 or FIG. 7. In one implementation, the words in a non-limiting preamble may be excluded from the word count of the document portion. That is, the number of words used for analyzing the breadth of the document portion is only the words included in the body. However, words in the preamble may be analyzed for the purpose of determining the commonness score of the document portion. Thus, selective use of the preamble for some but not all parts of determining a breadth score is contemplated.

If, however the preamble is determined at 818 to be limiting, method 800 proceeds to 822 and the breadth score is calculated with the preamble. Thus, the preamble may be used both for determining the word count and the commonness score of the document portion. In other words, because the preamble is limiting it is treated the same as the body of the document portion for the purposes of calculating the breadth score.

At 824, it is determined if the transition phrase in the preamble is open or closed. An "open" transition phrase allows a patent claim to include additional elements beyond those explicitly listed. The transition phrases "comprising," "including," "having," and "containing" indicate an open preamble. In contrast, a "closed" transition phrase limits the patent claim to only those elements listed, no more and no less. Closed transition phrases include "consisting of," "composed of," "constituting," and "being." As used herein, "closed" transition phrases also include partially closed transition phrases that allow addition of elements that do not affect the basic and novel characteristics of a claimed invention. Partially closed transition phrases include "consisting essentially of" and "consisting prevailingly but not essentially of" Transition phrases may be detected by comparison to a list or look-up table that includes transitions phrases and classifications of individual transition phrases as open, closed, or partially closed. Transition phrases may be identified after stemming based on the word stems.

If the transition phrase is determined to be open at 824, method 800 proceeds to 826 and the breadth score calculated for the claim is retained. Stated different, breadth for patent claims with open transition phrases is calculated "normally." Thus, whatever breadth score was calculated based on the techniques described above is retained and potentially displayed or used for later processing.

If the transition phrase is determined to be closed at 824, method 800 proceeds to 828 and the breadth score is modified because of the closed transition phrase. The breadth score is modified to represent lower levels of breadth in response to determining that the transition phrase for a claim is closed. Depending on how the breadth score is represented this may lead to a decreased breadth score (i.e., if a higher number indicates greater breadth). For example, the breadth score may be reduced by a predetermined percentage such as any amount between 1% and 99%. The breadth score may also be reduced by a set number of points such as 1, 2, 3, 4, 5, 10, 15, 25, 50, 75, 100, etc. The amount of reduction may be less for partially closed transition phrases. For example, a patent claim with a closed transition phrase may have a breadth score reduced by 50% while a patent claim with a partially closed transition phrase may have a breadth score reduced by 40%. The extent of modification may also be based on one or more other characteristics of the claim such as classification (e.g., Cooperative Patent Classification (CPC) class). For example, if classified as a chemical compound the amount of penalization may be reduced because claims with closed preambles in that classification may typically be more valuable than claims with closed preambles in other classifications. In an implementation, as an alternative to the determination and subsequent modification of a breadth score, the penalization may occur in, e.g., the calculation of the commonness of the closed or partially closed transition phrase, directly resulting in a lower initial breadth score than would otherwise have been produced for such a claim.

If a corpus of document portions, such as patent claims, is being scored there may be multiple document portions with open preambles and likely fewer, but still multiple, with closed preambles. In an implementation, a breadth score may be calculated for each of the document portions without adjusting the breadth score itself due to the type of transition phrase. But the ranking may rank all the document portions with open preambles as broader than the document portions with closed preambles. That is, the open preamble claims may be ranked from broadest to narrowest and then following the narrowest claim with an open preamble, the ranking may continue beginning with the broadest of the claims closed preambles. In this implementation, claims with partially closed preambles may be ranked before those with closed preambles. In an implementation, the claims with closed preambles may not even be included in the same ranking as the claims with open preambles but listed on an entirely separate list.

Furthermore, whenever a document portion is determined to have a closed preamble that portion may be flagged as having an associated anomaly or "problem" as part of the anomaly detection 118.

At 830, a UI displaying the breadth score may be generated. The UI may be a textual UI, a graphical UI (GUI), or another type of UI. In one implementation, the UI may be the same or similar to the UI 128 shown in FIGS. 1 and 2. The UI may include one or more indicia for those document portions that contain a transition anomaly, a limiting preamble, and/or a closed transition phrase. If a breadth score for a document portion is different than it would be otherwise because the transition phrase is closed, both the breadth score calculated without regard to the type of transition phrase and the breadth score accounting for the closed transition phrase may be included in the UI.

Figure 9A:
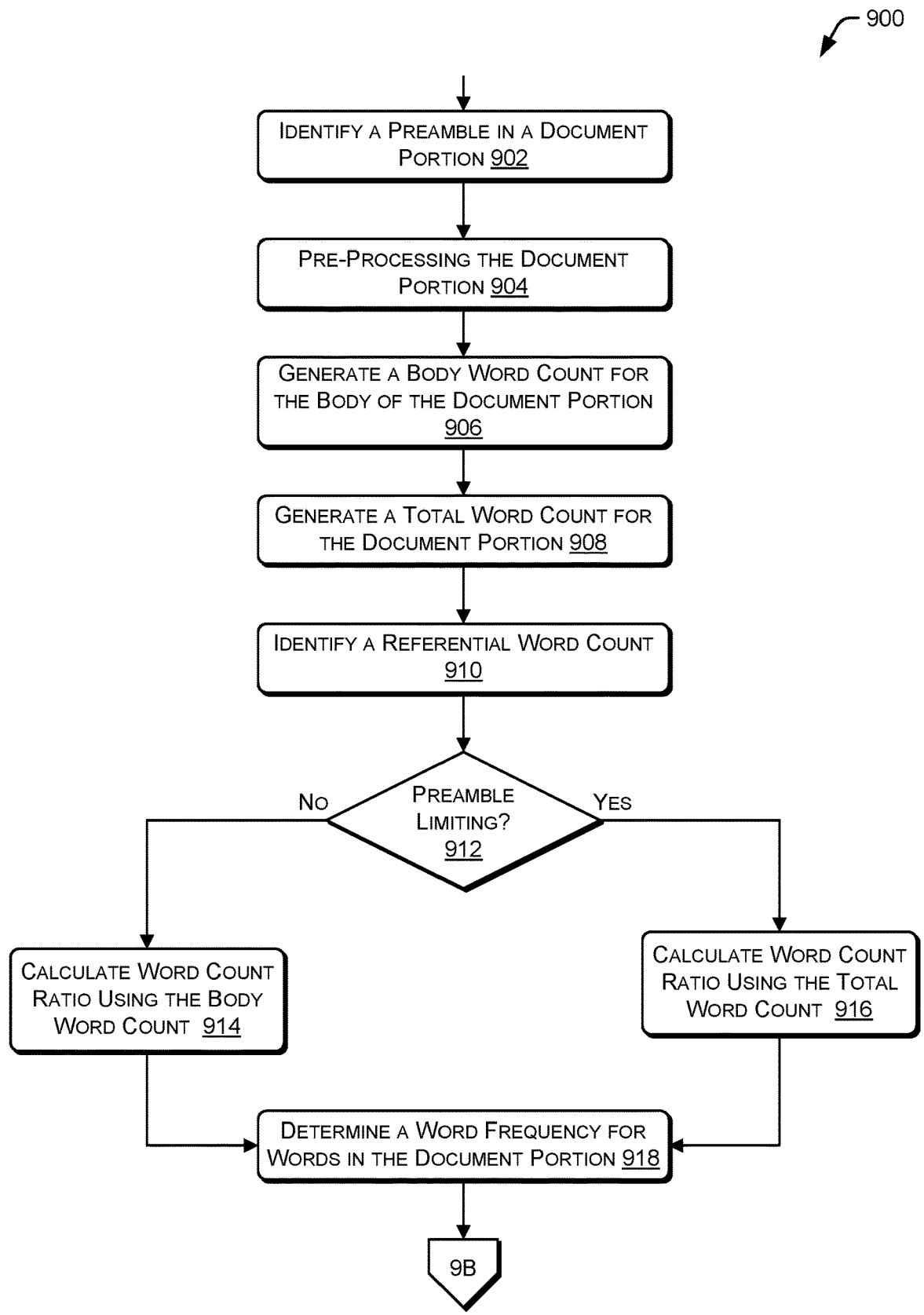
FIGS. 9A and 9B are a flowchart showing an example method for automatically processing a document portion based on a preamble in that document portion.
Figure 9B:
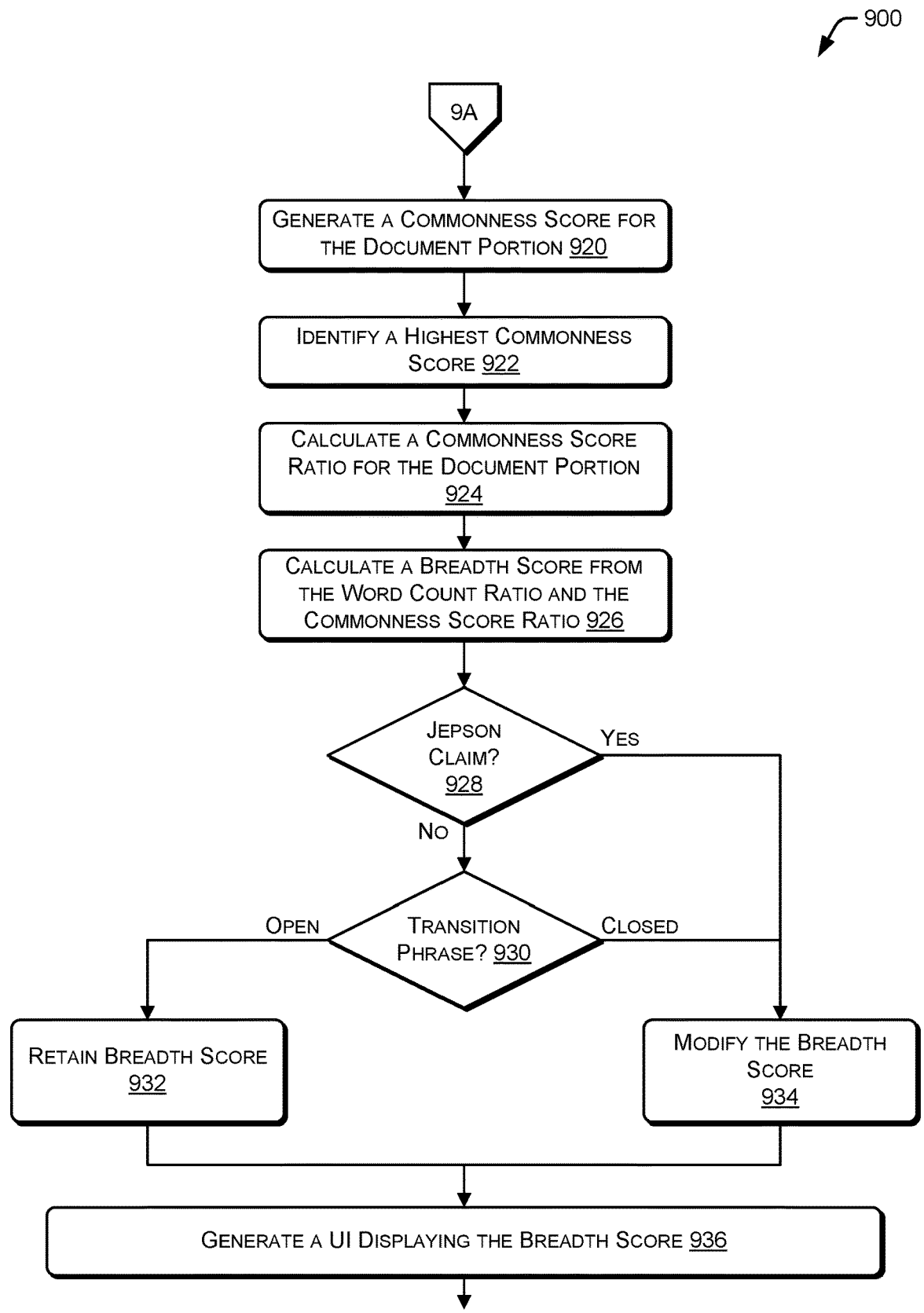

FIGS. 9A and 9B show a flowchart depicting example method 900 of automatically assigning a breadth score for a document portion based on a preamble in the document portion. Portions of method 900 may be the same or similar to portions of methods 300-800 described above.

At 902, a preamble is identified in text representing a document portion. The body of the document portion is the remaining text that is not the preamble. Thus, the document portion may be divided into two parts: the preamble and the body. The document portion may be obtained from a corpus of document portions such as stored in one of the data repositories 102. The document portion may be obtained as a part of a document that contains additional text besides the document portion. In an implementation, the document portion may be identified by method 300.

At 904, the document portion may be pre-processed. This pre-processing may be the same or similar to the pre-processing 112 shown in FIG. 1. This pre-processing may be the same or similar to method 400. Thus, the pre-processing may include any or all of stemming words, removing duplicate words, and removing stop words. In an implementation, all or part of the pre-processing may be performed after identification of the preamble because certain pre-processing actions such as, for example, removing stop words may increase the difficulty of automatically identifying the preamble.

At 906, a body word count is generated for the body of the document portion. The body word count may be generated by counting a number of words in the text of the body of the document portion. Generating the body word count may be performed in a manner similar to operation 608 in method 600 except that only words in the body are counted.

At 908, a total word count is generated for the document portion. The total word count includes all the words in both the preamble and the body of the document portion. If the document portion includes a third sub-portion besides the preamble and the body, any text in that third sub-portion may be counted as well for the total word count. Generating the total word count may be performed in a manner similar to operation 608 in method 600. Thus, at this point the document portion is now associated with two word counts: the body word count and the total word count. A preamble word count may be generated by subtracting the body word count from the total word count.

At 910, a referential word count is identified. This may be done by the same or similar technique as operation 610 in method 600.

At 912, it is determined if the preamble is limiting. This may be done by the same or similar technique as operation 812 in method 800. Thus, the determination of limiting or non-limiting may be made in response to determining that a number of words in the preamble exceeds a threshold number, a term in the preamble provides antecedent basis for a term in the body of the document portion, the preamble contains the word "improvement," or another factor.

If the preamble is not limiting, method 900 proceeds to 914. If the preamble is limiting, method 900 proceeds to 916.

At 914, a word count ratio for the document portion is calculated using the body word count. The word count ratio is thus calculated by dividing the referential word count from 910 by the body word count from 906. The specific techniques for calculating a word count ratio may be the same or similar to operation 612 of method 600.

At 916, a word count ratio for the document portion is calculated using the total word count. The word count ratio is thus calculated by dividing the total word count from 910 by the body word count from 906. The specific techniques for calculating a word count ratio may be the same or similar to operation 612 of method 600. The difference between 914 and 916 is that if a preamble is limiting the words in the preamble are counted for the purpose of determining the word count ratio.

At 918, a word frequency is determined for words in the document portion. The word frequency may be determined by the same or similar techniques as operation 614 of method 600. The word frequency may be determined for all words in the document portion or for only words in the body. For example, if the preamble is determined to be non-limiting then word frequency may not be calculated for words in the preamble.

At 920, a commonness score is generated for the document portion. The commonness score may be determined by the same or similar techniques as operation 616 of method 600. Thus, the commonness score may be generated by taking the square root of the sum of the squares of the inverse of the word frequency for each one of the separate words in the text representing the document portion. This may be done for all of the text representing the document portion or alternatively only for the text in the body of the document portion.

At 922, a highest commonness score is identified. The highest commonness score is identified from the document portions in the corpus of document portions under analysis. Identifying the highest commonness score may be done in a manner that is the same or similar to operation 618 of method 600.

At 924, a commonness score ratio is calculated for the document portion. Calculating the commonness score ratio may be performed in the same or similar manner as operation 620 of method 600.

At 926, a breadth score is calculated from the word count ratio and the commonness score ratio. The breadth score may be calculated in the same way as the breadth calculation described in 124 of FIG. 1. The breadth score may also be calculated in the same or similar manner as the overall score in operation 622 of method 600

At 928, it is determined if the document portion contains words or phrases indicating that it is a Jepson claim. In one implementation, if the document portion includes the words "wherein the improvement comprises" anywhere then it is classified as a Jepson claim. In one implementation, if the preamble contains the word "improvement" then it is classified as a Jepson claim. In one implementation, if the preamble includes the word "improvement" within a threshold number of words from a transition phrase in the preamble then the document portion is classified as a Jepson claim. If the document portion is classified as a Jepson claim then the preamble is determined to be limiting and method 900 proceeds to 934.

At 930, it is determined if the transition phrase is open or closed. Determining if the transition phrase is open or closed may be done in the same manner as in operation 818 of method 800.

At 932, the breadth score calculated at 926 is retained without immediate modification. Thus, the breadth score is not modified in response to determining that the transition phrase is open. But the breadth score may be modified later for a different reason.

At 934, the breadth score calculated at 926 is modified. The breadth score may be modified because the document portion is a Jepson claim, the transition phrase is closed, or for another reason. Other reasons for modifying the breadth score may include determining that a document portion is a means-plus-function claim. The document portion may also have its breadth score penalized if it includes absolute words, exemplary words, and/or relative/approximate words. The breadth score may be modified to indicate less breadth (i.e., a lower score if higher scores indicate greater breadth) in response to classifying the document portion as a Jepson claim or determining that the preamble includes a closed transition phrase. In an implementation, as an alternative to the determination and subsequent modification of a breadth score, penalization may occur in, e.g., the calculation of the word count or commonness score that directly results in a lower initial breadth score than would otherwise have been produced for such a claim.

At 936 a UI displaying the breadth score is generated. The UI may be a textual UI, a GUI, or another type of UI. In one implementation, the UI may be the same or similar to the UI 128 shown in FIGS. 1 and 2. The UI may include one or more indicia for those document portions that contain a limiting preamble, a Jepson claim, and/or a closed transition phrase. If a breadth score for a document portion is modified for any reason then both the unmodified and modified breadth scores may be included in the UI. A GUI may include a graphical representation of a difference in the breadth score before and after modification.

Illustrative Computing Device(s)

Figure 10:
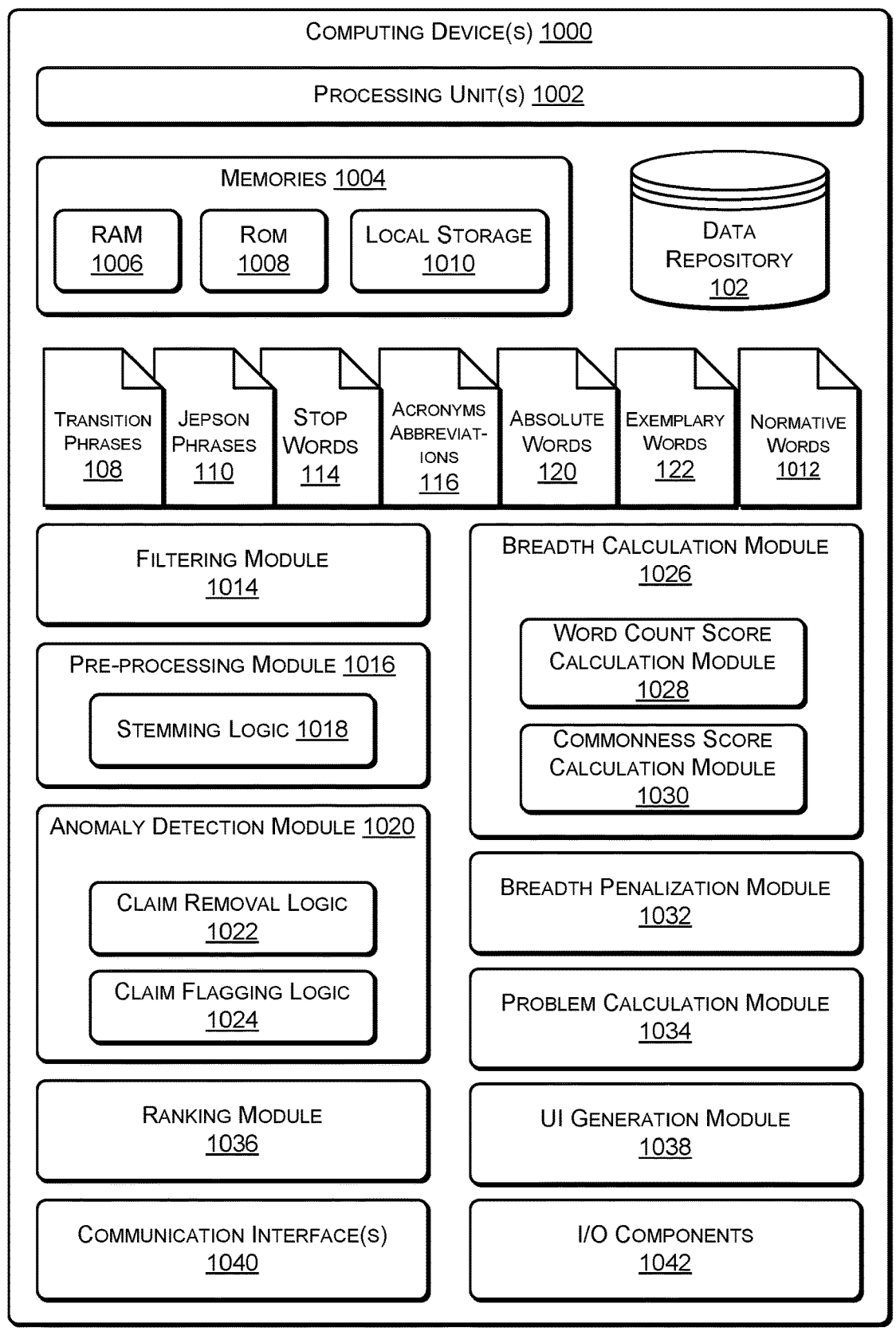
FIG. 10 shows a schematic diagram of one or more computing devices designed for automatic, human-emulative processing of documents.

FIG. 10 shows a schematic block diagram of an example computing device(s) 1000. Examples of the computing device(s) 1000 may include a server, a desktop PC (personal computer), a notebook or portable computer, a workstation, a mainframe computer, a handheld device, a netbook, an Internet appliance, a portable reading device, an electronic book reader device, a tablet or slate computer, a game console, a mobile device (e.g., a mobile phone, a personal digital assistant, a smart phone, etc.), or a combination thereof. The computing device(s) 1000 may be implemented as a single device or as a combination of multiple physically distinct devices. For example, computing device(s) 1000 may be implemented as a combination of a server and a client.

The computing device(s) 1000 may include one or more processing units 1002 and memories 1004, both of which may be distributed across one or more physical or logical locations. The processing unit(s) 1002 may include any combination of central processing units (CPUs), graphical processing units (GPUs), single core processors, multi-core processors, processor clusters, application-specific integrated circuits (ASICs), programmable circuits such as Field Programmable Gate Arrays (FPGA), Application-specific Standard Products (ASSPs), System-on-a-chip systems (SOCs), Complex Programmable Logic Devices (CPLDs), and the like. One or more of the processing unit(s) 1002 may be implemented in software or firmware in addition to hardware implementations. Software or firmware implementations of the processing unit(s) 1002 may include computer- or machine-executable instructions written in any suitable programming language to perform the various functions described. Software implementations of the processing unit(s) 1002 may be stored in whole or part in the memories 1004.

The memories 1004 are representative of any number of forms of memory including both persistent and non-persistent memory. In one implementation, the memories 1004 may include computer-readable media in the form of volatile memory, such as random access memory (RAM) 1006 and/or non-volatile memory, such as read only memory (ROM) 1008 or flash RAM. RAM 1006 includes, but is not limited to, integrated circuits, phase change memory (PRAM), static random-access memory (SRAM), dynamic random-access memory (DRAM), and other types of RAM. ROM 1008 includes erasable programmable read-only memory (EPROM), electrically erasable programmable read-only memory (EEPROM), flash memory, and NAND flash. Memories 1004 of the computing device(s) 1000 may also include removable storage, non-removable storage, and/or local storage 1010 to provide long- or short-term storage of computer-readable instructions, data structures, program modules, and other data.

The memories 1004 are an example of computer-readable media. Computer-readable media includes at least two types of media: computer-readable storage media and communications media. Computer-readable storage media includes volatile and non-volatile, removable and non-removable media implemented in any method or technology for storage of information such as computer readable instructions, data structures, program modules, or other data, RAM 1006, ROM 1008, flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable storage media does not include transitory media such as modulated data signals and carrier waves.

In contrast, communications media may embody computer-readable instructions, data structures, program modules, or other data in a modulated data signal, such as a carrier wave, or other transmission mechanism. As defined herein, computer-readable storage media and communications media are mutually exclusive.

In one implementation, the memories 1004 may include a plurality of databases such as the data repository 102. However, as noted above, in other examples the data repository 102 may be separate from the both the memories 1004 and the computing device(s) 1000. The one or more data repositories 102 may contain a collection of patent documents such as issued patents or published patent applications. The collection of patents or patent applications may be defined by, for example, a portfolio of a patent owner, a classification of a taxonomy (e.g., public taxonomy such as a classification system of a patent office or governmental agency, a private taxonomy such as a taxonomy for a private company, a taxonomy set by a standards body or an industry, etc.), results of a search, or any other collection of patent documents.

By way of example and not limitation, the memories 1004 may also include multiple words and/or phrases such as the stop words 114 and the acronyms and abbreviations 116 as shown in FIG. 1 as well as other words such as normative words 1012. Any or all of the collections of words and/or phrases may be stored in the memories 1004 as lists, as lookup tables, or may be directly included into computer code corresponding to one of the modules described below.

A filtering module 1014 may be present in the memories 1004 and coupled to the one or more processing unit(s) 1002. The filtering module 1014 may modify the data obtained from the data repository 102 to generate a reduced set of data that is the corpus of documents for subsequent analysis. The filtering module 1014 may perform any or all of the method 300 shown in FIG. 3. The filtering module 1014 places documents from the data repository 102 that are retained post filtering into local storage 1010 of the computing device(s) 1000. Presence of the filtered documents in the local storage 1010 may provide for faster analysis by the other modules as compared to accessing the documents in a remote storage location.

A pre-processing module 1016 may be present in the memories 1004 and coupled to the one or more processing unit(s) 1002. The pre-processing module 1016 may process document portions such as patent claims prior to determination of breadth. This pre-processing may include delimiting individual claims, stemming words to root forms, removing duplicate root forms, and removing stop words 114. The pre-processing module 1016 may perform any or all of method 400 shown in FIG. 4. In an implementation, the stop words 114 may come from a stop word adjustment file that is read in and used for the processing of document portions. The stop word adjustment file may be specific to a given portfolio or corpus of documents.

The pre-processing module 1016 may include stemming logic 1018. The stemming logic 1018 generates root forms of words using a stemming algorithm. A stemming algorithm is a process of linguistic normalization, in which the variant forms of a word are reduced to a common form or a root form. There are many possible stemming algorithms which may be used including use of a lookup table, suffix stripping, Lemmatisation, stochastic algorithms, n-gram analysis, matching algorithms, Porter, Porter2, Paice-Husk, Lovins, and Porter Stemmer. Porter stemmer follows the algorithm presented in Porter, M "An algorithm for suffix stripping." Program 14.3 (1980): 130-137. The stemming logic 1018 may function in part by passing values to an external stemming operation and receiving results back. One technique for implementing this is by using an API to call an external module or computing system that provides stemming functionality. An application program interface (API) is a set of routines, protocols, and tools for building software applications. An API specifies how software components should interact. APIs that provide stemming include EnClout Stemmer, EnClout Term Analysis, and Text-Processing.

An anomaly detection module 1020 may be present in the memories 1004 and coupled to the one or more processing unit(s) 1002. The anomaly detection module 1020 may detect two types of anomalies: anomalies that lead to removal of a patent claim from further analysis and anomalies that result in flagging a patent claim for manual review. The anomaly detection module 1020 may include claim removal logic 1022 that is configured to detect and remove dependent claims and deleted claims from the claims under consideration for analysis of breadth. In some implementations, the claim removal logic 1022 may also remove any or all of claims without detectable preambles, claims with closed transition phrases, Jepson claims, and means-plus-function claims. Removing the dependent claims and/or deleted claims may include deleting records corresponding to those claims or indicating that the records correspond to the claims are to be ignored during subsequent analysis. One way of doing this is by creating a separate list that is stored in the memories 1004, such as the local storage 1010, that includes only those claims which are not ignored. Thus, subsequent analysis may be performed on only the claims contained in this list. Claim flagging logic 1024 which may also be present in the anomaly detection module 1020 is configured to generate a flag or other indicium that is associated with those flags which have a type of anomaly or problem that warrants further evaluation but not removal. The anomaly detection module 1020 may perform any or all of method 500 shown in FIG. 5. The anomaly detection module 1020 may additionally or alternatively contain the first set of rules described in operation 704 of FIG. 7.

The anomaly detection module 1020 may reference one or more lists of Jepson phrases 110, stop words 114, absolute words 120, exemplary words 122, and/or normative words 1012. The referencing may be done during processing by reading in a list or the list may be integrated into the code that is performing the anomaly detection. In either implementation, part of the section may include a comparison between words in a portion of a document and "anomalous" or "problematic" words. This comparison may be implemented in part by use of one or more lookup tables. The lookup tables may be pre-calculated and stored in static program storage, calculated (or "pre-fetched") as part of a program's initialization phase (memorization), or even stored in hardware in application-specific platforms. In some programmatic implementations, the lookup tables may include pointer functions (or offsets to labels) to process the matching input. To improve processing speed, one or more field-programmable gate arrays (FPGA) may use reconfigurable, hardware-implemented, lookup tables to provide programmable hardware functionality. For example, and to potentially increase processing speed, a list of default words and/or terms from any of the lists described above could be configured as hardware-implemented lookup tables.

A breadth calculation module 1026 may be present in the memories 1004 and coupled to the one or more processing unit(s) 1002. The breadth calculation module 1026 may be configured to calculate a breadth score for individual document portions. If the individual document portions are patent claims, then the breadth calculation module 1026 may calculate claim breadth scores for each of individual claims. This calculation may be performed only for the claims or other document portions that are not removed by either the pre-processing module 1016 or the anomaly detection module 1020. As described above, breadth is based on a word count score and a commonest score. Thus, the breadth calculation module 1026 may include one or both of a word count score calculation module 1028 and a commonness score calculation module 1030. The breadth calculation module 1026 may perform any or all of operations 608, 610, 612, 614, 616, 618, 620, 622 of method 600 shown in FIG. 6.

The word count score calculation module 1028 may be configured to determine a word count score for a claim based on a word count for the claim and a maximum word count for another claim that has the highest word count. The claim under analysis and the other claim with the highest word count are both drawn from the same corpus of patent documents. Thus, the word count score calculation module 1028 may determine a word count for each claim under analysis and identify which of those claims has the most words. In an implementation, the word count score calculation module 1028 may contain the second set of rules described in operation 714 of FIG. 7. The word count score calculation module 1028 may count or not count the words in a preamble of a document portion based on identification of that preamble as being limiting or non-limiting. The determination of how to handle words in the preamble may be made in a manner that is the same or similar to operation 812 shown in FIG. 8 and/or operation 912 shown in FIG. 9A.

The commonness score calculation module 1030 may be configured to determine a commonness score for the claim based on the frequencies individual words in the claim occur throughout all of the claims in the corpus of patent documents. The commonness score calculation module 1030 may determine a commonness score for each claim under analysis and identify which of those claims is the most "common" due to having the highest commonness score. The ratio of a claim's individual commonness score and the highest commonness score may be used to represent the commonness score for that claim for the purposes of calculating breadth. In an implementation, the commonness score calculation module 1030 may contain the third set of rules described in operation 716 of FIG. 7. The breadth calculation module 1026 may combine results generated by the word count score calculation module 1028 and the commonness score calculation module 1030 to generate a breadth score for each claim or other document portion. The breadth score for each claim or document portion may be generated in a manner similar to that described by operation 622 in FIG. 6 or operation 718 in FIG. 7.

A breadth penalization module 1032 may be present in the memories 1004 and coupled to the one or more processing unit(s) 1002. The breadth penalization module 1032 may identify a category of narrowing feature in a document portion and modify the breadth score calculated by the breadth calculation module 1026. This generates a modified breadth score for the document portion that is based on the original breadth score and the category of the narrowing feature. The modification generally, but not necessarily, results in a change to the breadth score that represents less breadth. Thus, if a higher raw score represents greater breadth, the breadth penalization module 1032 may reduce that score by a percentage or by a fixed number. Conversely if a lower score represents greater breadth, then an increase in the score represents a reduction in breadth. Certain categories of narrowing features of document portions may be understood to correlate with reduced breadth yet the breadth calculation performed by the breadth calculation module 1026 may fail to capture the narrowing effect. For example, a means-plus-function claim may be short and use common words, but its actual breadth may be much narrower than would be calculated by considering word count and word frequency alone due to limitations imposed by the mean-plus-function format.

The breadth penalization module 1032 may account for this by reducing the breadth score by a predetermined percentage. For example, the percentage of reduction may be 5%, 10%, 15%, 20%, 25%, 30%, 35%, 40%, 45%, 50%, 55%, 60%, 65%, 70%, 75%, 80%, 85%, 90%, or 95%. The reduction may also be by a set numerical value such as 1, 2, 3, 4, 5, 10, 15, 25, 50, 75, 100, etc. The amount of reduction may be arbitrary and adjusted based on trial and error and iterative comparison to results obtained by human ranking. In an implementation, the breadth penalization module 1032 may interact with the commonness score calculation module 1030 to calculate the breadth score generated by the breadth calculation module 1026. Specifically, the breadth penalization module 1032 may modify the frequency value of certain words or phrases in a document portion so that those words or phrases are counted as less frequent than they in fact appear in the corpus of documents. As described above in the calculation of a commonness score, the presence of highly infrequent words results in a lower or narrower breadth value. For example, absolute words 120 may be given penalized frequency values that are 1/10 the actual frequency of those words in the corpus of documents. Of course the extent of frequency reduction may be an amount other than 1/10 such as reduction by half, reduction by one quarter, reduction by 1/20, reduction by 1/100, etc. Additionally, different types of narrowing features may be penalized differently by different adjustments to frequency. For example, if the frequency of absolute words 120 is reduced by 1/10, then the frequency of normative words 1012 may be reduced by 1/2, and relative or approximate terms may be reduced by 1/5.

The breadth penalization module 1032 may consider any of the potentially narrowing features described below but is not limited to considering only the features explicitly listed herein. The penalization or adjustment may be different for different types of potentially narrowing features.

One of the more limiting types of "anomalies" in a document portion is a closed transition phrase. A closed transition phrase (e.g., "consisting of" or "consisting essentially of") may reduce the breadth of a document portion. By excluding all elements other than those explicitly listed, a closed transition phrase may have a significant narrowing effect. Thus, the penalization imposed by identifying a closed transition phrase may be greater than the penalization imposed by other types of narrowing features.

Determining that a claim is a means-plus-function claim may also result in penalization of the breadth score. In an implementation, the number of means-plus-function elements in a claim may be counted and the amount of penalization may be related to the number of means-plus-function elements. The relationship may be, for example, linear so that a claim which includes one means-plus-function element is reduced by a first amount while a claim that includes three means-plus-project elements is reduced by three times that first amount. The number of means-plus-function elements in a claim may be determined by any appropriate language processing technique such as, simply counting the number of instances that "means," "step," or another equivalent term such as a nonce word appears in the text of a patent claim.

In addition to the penalization techniques described above, a means-plus-function claim may be penalized or modified by replacing the "means" terms with the corresponding structure from another portion of the patent document. Specifically, analysis of a portion of a patent document such as a detailed description may identify language that corresponds to the "means" recited in the claims portion of that document. The analysis may be performed by natural language processing (NLP) or another automated technique for understanding the content of a textual document. The text of the claim portion may then be modified by deletion of a "means" term and substitution of the text describing the corresponding structure. This likely increases the number of words in the means-plus-function claim and may add more infrequent words. Thus, this change is likely to affect the breadth calculation by reducing the breadth score for the means-plus-function claim.

NLP is a way for computers to analyze, understand, and derive meaning from human language in a smart and useful way. By utilizing NLP, developers can organize and structure knowledge to perform tasks such as automatic summarization, translation, named entity recognition, relationship extraction, sentiment analysis, speech recognition, and topic segmentation. NLP algorithms are typically based on machine learning algorithms. Instead of hand-coding large sets of rules, NLP can rely on machine learning to automatically learn these rules by analyzing a set of examples (i.e. a large corpus, like a book, down to a collection of sentences), and making a statistical inference. In general, the more data analyzed, the more accurate the model will be.

Document portions determined to be Jepson claims may have reduced breadth scores. The amount of penalization may be based on the ratio of words in the preamble to words in the body of the claim. Thus, a longer preamble establishing more words that are outside the scope of the claim (i.e., because of the specific use of preambles in Jepson claims) may lead to a greater reduction in breadth score. Also, the shorter the body describing the "new" features of the claim may also lead to a greater breadth score.

One or more absolute words 120 in a document portion may result in a reduction in breadth score. In an implementation, the amount of reduction may be related to the number of absolute words 120 identified. A greater number of absolute words 120 in a document portion may result in a greater reduction of breadth score. The relationship may be linear so, for example, one absolute word 120 may result in a 5% reduction in breadth and two absolute words 120 may result in a 10% reduction. In an implementation, absolute words 120 anywhere in a document may reduce the breadth score for that document. For example, in a patent document the presence of absolute words 120 in the detailed description may reduce the breadth score for that document even if there are no absolute words 120 in the patent claims or other particular document portion. Breadth penalization due to the detection of any absolute words 120 within detailed description or body of a patent document may be less than the amount of penalization when absolute words 120 are detected in a claim. For example, the raw breadth score may be reduced by 1 for each absolute word 120 detected anywhere in the document and reduced by 5 for each absolute word 120 detected in a specified document portion such as a claim.

The breadth penalization module 1032 may also reduce a breadth score due to the presence of relative or approximate terms (or word stems if stemming is used) such as:
 "sufficient"
 "predetermined"
 "closely"
 "more"
 "less"
 "essentially"
 "generally"
 "approximately"
 "similar"
 "substantially" and
 "superior"

As with absolute words 120, the amount of reduction may be based on the number of separate words identified and location of the words in a particular document portion.

Words found in a patent claim that are not also found in another portion of the patent document such as the detailed description may be identified as "unsupported words" and the breadth penalization module 1032 may penalize the breadth score of a document portion for the presence of words or phrases that lack support. As with absolute words 120 and relative or approximate terms, the amount of the reduction may be based on the number of terms that lack support.

As discussed above, the breadth penalization module 1032 may penalize different features differently. One illustrative order of the presumed narrowing effect of different features is: closed transition phrase>means-plus-function claim>Jepson claim>absolute words>narrowing preamble>relative or approximate terms>unsupported words. Thus, the amount of breadth reduction, by percentage, raw numerical adjustment, or otherwise, is greater for those features understood to have a greater narrowing effect. This order may be implemented by the breadth penalization module 1032 by, for example, reducing the breadth score of a claim with a closed preamble by a first factor, a means-plus-function claim by a second factor, and a claim with a limiting preamble by a third factor. The first factor, the second factor, and the third factor may all be different from each other such as different percentages or different numerical adjustments. In the order described above, the first factor is a greater reduction in scope than the second factor which is in turn a greater reduction in scope than the third factor.

A problem calculation module 1034 may be present in the memories 1004 and coupled to the one or more processing unit(s) 1002. The problem calculation module 1034 identifies one or more problems with a document portion and may calculate a "problem score" for the document portion based on the problem(s). The problems represent identification of features in the document portion that are presumed to vary from "ideal" content of the document portion. For example, a financial document describing an investment opportunity which promises future financial results may be flagged as having a problem and given a problem score because the problem calculation module 1034 is designed to identify promises of future financial results as a "problem." In the context of patent claims, narrowing features may also be classified as "problems" for the purpose of automatic analysis although narrowing features may not necessarily represent errors. The problem score for document or document portion may be based on the type of problem or problems present as well as the number of problems. For example, an abstract with a misspelling may be assigned a relatively small problem score while a patent document that appears to lack a claims section may be assigned a very large problem score. The problem score is a metric that may be calculated, recorded, and stored in the memories 1004 separate from either the word count score or the commonness score discussed above.

Many of the features that can be analyzed by the breadth penalization module 1032 may also be analyzed by the problem calculation module 1034 for the purposes of calculating a problem score. Thus, lack of an identifiable preamble, a closed transition phrase, Jepson claim status, means-plus-function claim status, a limiting preamble, use of absolute words 120, use of normative words 1012, use of relative or approximate terms, and use of unsupported words may all cause a problem score to increase. A greater problem score is described herein as representing more "problems" but the problem score may also be implemented so that a smaller numerical value represents more problems. Thus, an "increase" in a problem score is to be understood as modifying a problem score to represent a greater extent of problems.

In an implementation, the problem score generated by the problem calculation module 1034 may be associated with a document portion or document as metadata. The problem score may also be presented in a UI separate from a breadth score. Access to a problem score may allow human reviewer to determine which document portions are appropriate for manual review. Making the problem score available may also allow comparison between different documents or groups of documents to determine which one or groups have relatively more "problems" than others.

In an implementation, the breadth penalization module 1032 may receive the problem score from the problem calculation module 1034 and modify the breadth score based on a value of the problem score. Thus, more "problematic" document portions may have a reduced breadth score due to the extent of problems. The breadth penalization module 1032 may reduce the breadth score if the problem score exceeds a threshold value. There may be different tiers of reduction so that a problem score exceeding different threshold values result in different levels of adjustment to the breadth score. For example, a problem score exceeding 50 may result in a 10% reduction in breadth while a problem score exceeding 100 may result in a 25% reduction in breadth. In an implementation, if the problem score exceeds a certain threshold, then the document portion may be excluded from further analysis and not presented in a ranking and/or not used as a basis to generate a breadth score for a document. This threshold for exclusion may be a predetermined value such as a problem score exceeding 60 or may be relative to the problem scores of other document portions in the analyzed corpus. For example, one or more document portions with the highest problem scores may be excluded.

A ranking module 1036 may be present in the memories 1004 and coupled to the one or more processing unit(s) 1002. The ranking module 1036 may be configured to rank the analyzed documents or document portions by order of breadth. For example, the ranking module 1036 may rank a number of published patent applications by the breadth of the claims contained in those applications. The ranking module 1036 may also rank individual claims of a particular patent or patent application to identify which is the broadest claim. Some types of documents may have multiple portions that can be assigned a breadth score. For example, patent documents may have multiple claims and more specifically multiple independent claims.

The ranking module 1036 may assign a document a single breadth score based on the breadth scores of one or more of the portions of the document. For example, the breadth score of a patent document may be the claim breadth score of the highest ranked independent claim in that patent document. The documents may then be ranked based on these breadth scores derived from their broadest document portion. Alternatively, the breadth scores assigned to document may be based on the breadth of a lowest ranked document portion, an average of the rankings of the multiple document portions, a median of the rankings the multiple document portions, or another metric derived from the individual breadth scores of portions of a document. Thus, modifications to breadth scores by the breadth penalization module 1032 may cause a first document portion to no longer be the highest ranked so that a second document portion becomes the highest ranked and the breadth score of the document is then based on the second document portion. Note that ignoring a document portion when calculating a breadth score for a document may have a similar effect of making that document portion irrelevant for the calculation of a document breadth score. For instance, if a first document portion that would have the highest breadth score is ignored due to anomalies or problems, then a breadth score of a second document portion may be used.

In an implementation, the ranking module 1036 may change the rank order of document portions based on anomalies detected by the anomaly detection module 1020 or problems identified by the problem calculation module 1034. For example, document portions having a certain type of feature may be ranked ordered below other document portions that lack such a feature regardless of the respective breadth scores. In one implementation, all patent claims with closed transition phrases may be ranked below patent claims with open transition phrases. Thus, a first patent claim with a closed transition phrase with a breadth score of 92 is ranked below a second patent claim with an open transition phrase and a breadth score of 7. This may be thought of as putting all document portions with a particular feature (e.g., a closed transition phrase) in a separate ranking and placing that ranking below another ranking.

In an implementation, the ranking module 1036 may additionally bin the results of the ranking into one of a set number of values. One binning implementation is by percentiles. Thus, the top 1% of the analyzed documents in terms of breadth would be all the given a rank of 100 even if the individual documents had slightly different breadth scores. The binning may divide the ranked documents into any number of different bins such as three different bins (e.g., high, medium, and low), 10 different bins, 100 different bins, or more. Thus, instead of 100,000 documents ranked from 1 to 100,000 in terms of breadth with each ranking being unique, each document may have a rank from 1 to 100 with several documents sharing each numerical level.

Some of the operations described above include summation, subtraction, multiplication, and/or division. The processing unit(s) 1002 may implement these operations by use of floating point computations. Floating point is a formulaic representation that approximates a real number so as to support a trade-off between range and precision. A number is, in general, represented approximately to a fixed number of significant digits (the significand) and scaled using an exponent in some fixed base; the base for the scaling is normally two, ten, or sixteen. A number that can be represented exactly is of the following form: significand× $base^{exponent}$, where significand is an integer base is an integer greater than or equal to two, and exponent is also an integer. The term floating point refers to the fact that a number's radix point (decimal point, or, more commonly in computers, binary point) can "float"; that is, it can be placed anywhere relative to the significant digits of the number. This position is indicated as the exponent component, and thus the floating-point representation is a form of scientific notation.

A floating-point system can be used to represent, with a fixed number of digits, numbers of different orders of magnitude. The result of this dynamic range is that the numbers that can be represented are not uniformly spaced; the difference between two consecutive representable numbers grows with the chosen scale. One example technique for floating point calculation is described in the IEEE 754 Standard. The current version, IEEE 754-2008 published in August 2008. The international standard ISO/IEC/IEEE 60559:2011 (with content identical to IEEE 754-2008) is published as ISO/IEC/IEEE 60559:2011 "Information technology—Microprocessor Systems—Floating-Point arithmetic."

A floating-point number consists of two fixed-point components, whose range depends exclusively on the number of bits or digits in their representation. The components linearly depend on their range, the floating-point range linearly depends on the significant range and exponentially on the range of exponent component, which attaches outstandingly wider range to the number. On an example computer system, a 'double precision' (64-bit) binary floating-point number has a coefficient of 53 bits (one of which is implied), an exponent of 11 bits, and one sign bit. Positive floating-point numbers in this format have an approximate range of $10^{-308}$ to $10^{308}$, because the range of the exponent is [−1022, 1023] and 308 is approximately $\log_{10}(2^{1023})$. The complete range of the format is from about $-10^{308}$ through $+10^{308}$ (see IEEE 754).

The number of normalized floating-point numbers in a system (B, P, L, U) where B is the base of the system, P is the precision of the system to P numbers, L is the smallest exponent representable in the system, and U is the largest exponent used in the system) is 2(B−1)(BP−1)(U−L+1)+1.

There is a smallest positive normalized floating-point number, Underflow level=UFL=BL which has a 1 as the leading digit and 0 for the remaining digits of the significand, and the smallest possible value for the exponent. There is a largest floating-point number, Overflow level=OFL=(1−B−P)(BU+1) which has B−1 as the value for each digit of the significand and the largest possible value for the exponent.

A UI generation module 1038 may be present in the memories 1004 and implemented by the processing unit(s) 1002. The UI generation module 1038 may generate or provide instructions to generate one or more user interfaces such as command-line user interfaces and/or graphic user interfaces. A command-line interface (also known as a command language interpreter (CLI), a command-line user interface, a console user interface, or a character user interface (CUI)), is an interface for interacting with a computer program where the user (or client) issues commands to the program in the form of successive lines of text (command lines). The interface is usually implemented with a command line shell, which is a program that accepts commands as text input and converts commands to appropriate operating system functions.

A GUI is a program interface that takes advantage of a computer's graphics capabilities to make the program easier to use. Well-designed GUIs can free a user from learning complex command languages. In one implementation, the UI generation module 1038 may generate a GUI such as the UI 128 shown in FIGS. 1 and 2.

A UI generated by the UI generation module 1038 may present a diagnostic report on a single document. The diagnostic report may contain a list of the anomalies, limiting features, and/or problems found in the document. If any of these issues are associated with a particular document portion, then that document portion may be identified. The effects of limiting features may be included in the UI (e.g., a limiting preamble reduced the breadth score by 11). The effects of particular problems may be included in the UI (e.g., the absolute word in claim 7 increased the problem score for that claim by 5). These types of effects may be included textually in the UI. In a GUI they may also be shown as graphical features. A diagnostic report provides reporting and insight into possible issues in a document that may need to be considered either for evaluation of the true breadth of that document or to make modifications to the document. If the document is one that may be changed, such as a document that is still being drafted, the insights may suggest ways to alter the document. Specific changes may be suggested and included in the diagnostic report. For example, there may be a suggestion to remove all text indicated by an exemplary word ( . . . a widget, for example a thingamajig or a doohickey . . . ) and replace with language that omits the optional portion ( . . . a widget[ . . . ] . . . ). In one implementation, a diagnostic report may be generated for each published patent application and automatically communicated to an assignee of that published patent application.

The UI generation module 1038 may also generate comparison reports that compare anomalies, limiting features, and/or problems in two or more documents or two or more sets of documents. For example, a comparison report may compare a first corpus of documents associated with a first feature (e.g., an assignee) and a second corpus of document associated with a second feature (e.g., a different assignee). A comparison report may include aggregate values for characteristics of two different sets of documents. For example, one aggregate value is an occurrence frequency. The occurrence frequency could be a ratio (e.g., 5/100) or a percentage (e.g., 5%). For example, the occurrence frequency could provide information on a number of documents in a corpus that have two or more problems. As a further example, the occurrence frequency could provide information on a number of patent claims that have mean-plus-function language. Additionally or alternatively, the comparison report could consider a particular issue such as absolute words and include in the UI information on a number of absolute words in each of the documents or sets of documents being compared.

The computing device(s) 1000 may include one or more communication interfaces 1040 for receiving and sending information. The communication interfaces 1040 may communicatively couple the computing device(s) 1000 to a communications network using any conventional networking protocol or technology. The computing device(s) 1000 may also include input-output (I/O) components 1042 for receiving input from human operators (e.g., a keyboard) and providing output (e.g., a monitor) to the human operators.

Example

A data repository containing 8,821 different issued U.S. utility patents related to computer security was evaluated by three different automatic breadth scoring techniques. One of the automatic techniques was the technique described in this disclosure that calculates a breadth score without identification or classification of preambles in the patent claims (referred to a "Claim Breadth"). The technique "Claim Breadth with Preamble" builds upon the "Claim Breadth" technique by identifying preambles and also determining if the preambles are limiting or not. For preambles that are determined to be limiting, words in the preamble are included in the word count but for preambles that are not limiting the words in the preamble are excluded from the word count for that claim. Words included in both limiting and non-limiting preambles are used for calculation of the commonness score.

The other techniques were Innography PatentStrength® and the Relecura Star Rating. Innography PatentStrength® is a proprietary algorithm that predicts patent value and relevance, by deriving the likelihood that a patent will eventually be litigated. The score assigned by Innography PatentStrength® ranges from 0-100 with 100 being the "best." The Relecura Star Rating is a different proprietary algorithm that predicts patent quality and ranges from 0-5 in increments of 0.5 (i.e., 10 different bins). A human experienced in evaluating patent claim scope manually reviewed 10 patents selected from the 8,821. Manual analysis of only 10 patents took between 10 and 30 minutes per patent. Thus, automatic document analysis provides a significant speed advantage over manual analysis.

The automatic document analysis technique described in this disclosure also provided results closer to the manual analysis than did the other automatic techniques. Thus, the Claim Breadth and Claim Breadth with Preamble techniques described here are more effective at emulating the results generated by a human than Innography PatentStrength® or Relecura Star Rating. Table 1 below shows the ranking of the patents as ordered by human analysis and the rankings generated by the techniques of this disclosure ("Claim Breadth"), Innography PatentStrength®, and Relecura Star Rating.

TABLE 1

Comparative Patent Rankings

|        | Pat. No. | Human Rank | Claim Breadth Raw | Claim Breadth Ranked | Innography Raw | Innography Ranked | Relecura Raw | Relecura Ranked |
|--------|----------|------------|-------------------|----------------------|----------------|-------------------|--------------|-----------------|
| broad  | '493     | 1          | 96                | *1*                  | 90             | 4                 | 3            | 5               |
|        | '409     | 2          | 55                | 5                    | 22             | 10*               | 2.5          | 9*              |
|        | '350     | 3          | 46                | 6                    | 91             | 2                 | 3.5          | *1*             |
| medium | '187     | 4          | 86                | *2*                  | 54             | 9                 | 3            | *5*             |
|        | '074     | 5          | 66                | *4*                  | 83             | 7                 | 3.5          | 1               |
|        | '250     | 6          | 35                | *7*                  | 93             | 1                 | 3.5          | 1               |
|        | '041     | 7          | 75                | *3*                  | 87             | *6*               | 2.5          | 9               |
| narrow | '583     | 8          | 6                 | *10*                 | 69             | *8*               | 3.5          | 1*              |
|        | '437     | 9          | 23                | *8*                  | 91             | 2*                | 3            | 5               |
|        | '146     | 10         | 14                | *9*                  | 90             | 4                 | 3            | 5               |

All of the automatic ranking techniques generated results different from each other and from manual evaluation by the human expert. In order to assess the rough correlation of an automatic ranking technique to the manual, human ranking, the 10 patents were grouped into three groups by breadth as determined through human analysis. The three broadest patents were included in a broad group. The middle four patents were included in a middle group. And the narrowest three patents were included in a narrow group.

Each automatic analysis technique that correctly ranked a patent in the same group as the manual ranking is given a point for placing the patent in the correct group: broad, middle, or narrow. This is indicated in Table 1 by the ranking being in italics. Thus, if the patent ranked number 1 by manual analysis was ranked 1, 2, or 3 by an automatic technique, then that automatic technique received a point for correctly ranking that patent in the broad group. The automatic analysis techniques also lost a point if they made a significant error by placing one of the patents from the narrow group in the broad group or vice versa. Significant errors are indicated in Table 1 by the ranking being followed by an asterisk.

Examination of Table 1 shows that Claim Breadth performed better than the other two automatic analysis techniques. Claim Breadth did not have any significant errors and correctly placed six of the 10 patents within the same broad group as the manual ranking. Thus, the Claim Breadth technique of this disclosure earned six points. Innography PatentStrength® had two significant errors and only placed four patents with the same broad groups as the manual ranking thereby earning two points. The Relecura Star Rating also had two significant errors and placed two patents within the same broad group as the manual ranking. Thus, Relecura Star Rating received zero points. The ranking generated by Claim Breadth is also much more correlated to the human ranking than either Innography PatentStrength® or Relecura Star Rating. Correlation is a measure of how strongly two variables are related to each other. A correlation of +100% indicates a perfect positive correlation, −100% indicates a perfect negative correlation, and 0% indicates no correlation. Claim Breadth had a 72.12% correlation with the human ranking. This is highly positive and indicates that a ranking generated by Claim Breadth is likely to be similar to that generated by manual analysis. Innography PatentStrength® had a slightly negative correlation at −23.78% indicating that ranking generated by Innography PatentStrength® is likely to be only somewhat similar to the ranking generated by manual analysis but ordered in the opposite direction. The Relecura Star Rating had essentially no correlation with a value of −9.30%. Thus, the techniques disclosed herein are quantitatively shown to provide more human-emulative patent claim scope ranking than other analytical techniques used by the patent analysis industry.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

The terms "a," "an," "the" and similar referents used in the context of describing the invention (especially in the context of the following claims) are to be construed to cover both the singular and the plural, unless otherwise indicated herein or clearly contradicted by context. As used herein in this document "or" means and/or. For example, "A or B" means A without B, B without A, or A and B. The term "based on" is to be construed to cover both exclusive and nonexclusive relationships. For example, "A is based on B" means that A is based at least in part on B and may be based wholly on B.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Furthermore, references have been made to publications, patents, or patent applications (collectively "references") throughout this specification. Each of the cited references is individually incorporated herein by reference for their particular cited teachings as well as for all that they disclose.

What is claimed is:

1. A computer-implemented method comprising:
   performing an analysis of text included in a document portion with respect to one or more predetermined criteria to identify a preamble of the document portion, the document portion including the preamble and a body that is separate from the preamble and the document portion is from a set of document specific portions included in a document and wherein the document is further included in a corpus of additional documents;

generating a body word count for a portion of the text included in the document portion, the portion of the text being included in the body of the document portion;

generate a total word count for the text included in the document portion;

identifying a referential word count;

determining if the preamble is limiting or non-limiting based at least partly on at least one of a number of words included in the preamble or a number of terms included in the preamble that are also included in the body of the document portion;

calculating a word count ratio by dividing the referential word count by:
the body word count if the preamble is non-limiting; or
the total word count if the preamble is limiting;

determining a word frequency for individual ones of words in the text included in the document portion, the word frequency for an individual word of the words being a total number of instances that the individual word is found in the document;

generating a commonness score for the document portion by taking the square root of the sum of the squares of the inverse of the word frequency for the individual ones of words in the text included in the document portion;

identifying a highest commonness score of a particular document portion in the document;

calculating a commonness score ratio for the document portion by dividing the highest commonness score by the commonness score for the document portion;

calculating a breadth score for the document portion based on a square root of a sum of the square of the word count ratio and the commonness score ratio;

repeating the calculation of the breadth score for other document specific portions from the set;

identifying, when processing the calculated breadth scores of the set of document specific portions, the document portion as a representative document portion of the document based at least in part on the calculated breadth score for the document portion satisfying a scoring requirement;

generating a ranking for the document based at least in part on the breadth score of the representative document portion relative to one or more additional breadth scores of additional representative document portions included in the additional documents; and generating a user interface by displaying at least entries ordered according to the ranking, wherein each of the ranked entries corresponding specifically to the document or one of the additional documents and each displayed entry includes a breadth score of document corresponding to the entry and the displayed entry is adjacent to text from an identified representative portion of the document corresponding to the entry.

2. The computer-implemented method of claim 1, further comprising determining that the preamble is limiting responsive to determining that at least one of:
a number of words in the preamble exceeds a threshold number;
a term in the preamble provides antecedent basis for a term in the body of the document portion; or
the preamble contains the word "improvement".

3. The computer-implemented method of claim 1, further comprising:
determining that the document portion includes the phrase "wherein the improvement comprises", determining that the preamble includes the word "improvement", or determining that the preamble includes the word "improvement" within a threshold number of words from a transition phrase in the preamble;
classifying the document portion as a Jepson claim; and
determining that the preamble is limiting.

4. The computer-implemented method of claim 3, further comprising modifying the breadth score responsive to classifying the document portion as a Jepson claim.

5. The computer-implemented method of claim 1, further comprising determining if the preamble includes an open transition phrase or a closed transition phrase by comparing words of the preamble to a list of words that includes transition phrases, wherein the list of words includes an individual classification of individual ones of the transition phrases and the individual classification includes open, closed, or partially closed.

6. The computer-implemented method of claim 5, further comprising modifying the breadth score responsive to determining that the preamble includes the closed transition phrase.

7. The computer-implemented method of claim 1, further comprising pre-processing the document portion by stemming words, removing duplicate words, and removing stop words after identifying the preamble.

8. The computer-implemented method of claim 1, wherein the one or more predetermined criteria include at least one of a colon being present in the document portion, a transition phrase being present in the document portion, or a transition phrase followed by a colon being present in the document portion.

9. A system comprising:
one or more processing units; and
one or more memories coupled to the one or more processing units, the one or more memories storing computer-executable instructions that, when executed by the one or more processing units, cause the one or more processing units to perform operations comprising:
performing an analysis of text included in a document portion with respect to one or more predetermined criteria to identify a preamble of the document portion, the document portion including the preamble and a body that is separate from the preamble and the document portion is from a set of document specific portions included in a document and wherein the document is further included in a corpus of additional documents;
generating a body word count for a portion of the text included in the document portion, the portion of the text being included in the body of the document portion;
generate a total word count for the text included in the document portion;
identifying a referential word count;
determining if the preamble is limiting or non-limiting based at least partly on at least one of a number of words included in the preamble or a number of terms included in the preamble that are also included in the body of the document portion;
calculating a word count ratio by dividing the referential word count by:
the body word count if the preamble is non-limiting; or
the total word count if the preamble is limiting;
determining a word frequency for individual ones of words in the text included in the document portion, the word frequency for an individual word of the words being a total number of instances that the individual word is found in the document;

generating a commonness score for the document portion by taking the square root of the sum of the squares of the inverse of the word frequency for the individual ones of the words in the text included in the document portion;

identifying a highest commonness score of a particular document portion in the document;

calculating a commonness score ratio for the document portion by dividing the highest commonness score by the commonness score for the document portion;

calculating a breadth score for the document portion based on a square root of a sum of the square of the word count ratio and the commonness score ratio;

repeating the calculation of the breadth score for other document specific portions from the set;

identifying, when processing the calculated breadth scores of the set of document specific portions, the document portion as a representative document portion of the document based at least in part on the calculated breadth score for the document portion satisfying a scoring requirement;

generating a ranking for the document based at least in part on the breadth score of the representative document portion relative to one or more additional breadth scores of additional representative document portions included in the additional documents; and generating a user interface by displaying at least entries ordered according to the ranking, wherein each of the ranked entries corresponding specifically to the document or one of the additional documents and each displayed entry includes a breadth score of document corresponding to the entry and the displayed entry is adjacent to text from an identified representative portion of the document corresponding to the entry.

10. The system of claim 9, wherein the one or more memories store additional computer-executable instructions that, when executed by the one or more processing units, cause the one or more processing units to perform additional operations comprising determining that the preamble is limiting responsive to determining that at least one of:

a number of words in the preamble exceeds a threshold number;

a term in the preamble provides antecedent basis for a term in the body of the document portion; or the preamble contains the word "improvement".

11. The system of claim 9, wherein the one or more memories store additional computer-executable instructions that, when executed by the one or more processing units, cause the one or more processing units to perform additional operations comprising:

determining that the document portion includes the phrase "wherein the improvement comprises", determining that the preamble includes the word "improvement", or determining that the preamble includes the word "improvement" within a threshold number of words from a transition phrase in the preamble;

classifying the document portion as a Jepson claim; and determining that the preamble is limiting.

12. The system of claim 11, wherein the one or more memories store further computer-executable instructions that, when executed by the one or more processing units, cause the one or more processing units to perform further operations comprising modifying the breadth score responsive to classifying the document portion as a Jepson claim.

13. The system of claim 9, wherein the one or more memories store additional computer-executable instructions that, when executed by the one or more processing units, cause the one or more processing units to perform additional operations comprising comparing words of the preamble to a list of words that includes transition phrases to determine if the preamble includes an open transition phrase or a closed transition phrase, wherein the list of words includes an individual classification of individual ones of the transition phrases and the individual classification includes open, closed, or partially closed.

14. The system of claim 13, wherein the one or more memories store further computer-executable instructions that, when executed by the one or more processing units, cause the one or more processing units to perform further operations comprising modifying the breadth score responsive to determining that the preamble includes the closed transition phrase.

15. The system of claim 9, wherein the one or more memories store additional computer-executable instructions that, when executed by the one or more processing units, cause the one or more processing units to perform additional operations comprising pre-processing the document portion by stemming words, removing duplicate words, and removing stop words after identifying the preamble.

16. The system of claim 9, wherein the one or more predetermined criteria include at least one of a colon being present in the document portion, a transition phrase being present in the document portion, or a transition phrase followed by a colon being present in the document portion.

17. One or more computer-readable storage media storing computer-executable instructions that, when executed by one or more processing units, cause the one or more processing units to perform operations comprising:

performing an analysis of text included in a document portion with respect to one or more predetermined criteria to identify a preamble of the document portion, the document portion including the preamble and a body that is separate from the preamble and the document portion is from a set of document specific portions included in a document and wherein the document is further included in a corpus of additional documents;

generating a body word count for a portion of the text included in the document portion, the portion of the text being included in the body of the document portion;

generate a total word count for the text included in the document portion;

identifying a referential word count;

determining if the preamble is limiting or non-limiting based at least partly on at least one of a number of words included in the preamble or a number of terms included in the preamble that are also included in the body of the document portion;

calculating a word count ratio by dividing the referential word count by:
the body word count if the preamble is non-limiting; or
the total word count if the preamble is limiting;

determining a word frequency for individual ones of words in the text included in the document portion, the word frequency for an individual word of the words being a total number of instances that the individual word is found in the document;

generating a commonness score for the document portion by taking the square root of the sum of the squares of the inverse of the word frequency for the individual ones of the words in the text included in the document portion;

identifying a highest commonness score of a particular document portion in the document;

calculating a commonness score ratio for the document portion by dividing the highest commonness score by the commonness score for the document portion;

calculating a breadth score for the document portion based on a square root of a sum of the square of the word count ratio and the commonness score ratio;

repeating the calculation of the breadth score for other document specific portions from the set;

identifying, when processing the calculated breadth scores of the set of document specific portions, the document portion as a representative document portion of the document based at least in part on the calculated breadth score for the document portion satisfying a scoring requirement;

generating a ranking for the document based at least in part on the breadth score of the representative document portion relative to one or more additional breadth scores of additional representative document portions included in the additional documents; and generating a user interface by displaying at least entries ordered according to the ranking, wherein each of the ranked entries corresponding specifically to the document or one of the additional documents and each displayed entry includes a breadth score of document corresponding to the entry and the displayed entry is adjacent to text from an identified representative portion of the document corresponding to the entry.

18. The one or more computer-readable storage media of claim 17, further comprising additional computer-executable instructions that, when executed by the one or more processing units, cause the one or more processing units to perform additional operations comprising comparing words of the preamble to a list of words that includes transition phrases to determine if the preamble includes an open transition phrase or a closed transition phrase, wherein the list of words includes an individual classification of individual ones of the transition phrases and the individual classification includes open, closed, or partially closed.

19. The one or more computer-readable storage media of claim 18, further comprising further computer-executable instructions that, when executed by the one or more processing units, cause the one or more processing units to perform further operations comprising modifying the breadth score responsive to determining that the preamble includes the closed transition phrase.

20. The one or more computer-readable storage media of claim 17, further comprising additional computer-executable instructions that, when executed by the one or more processing units, cause the one or more processing units to perform additional operations comprising pre-processing the document portion by stemming words, removing duplicate words, and removing stop words after identifying the preamble.

* * * * *